(12) United States Patent
Ishaq et al.

(10) Patent No.: US 9,866,651 B2
(45) Date of Patent: Jan. 9, 2018

(54) ENTITY CREATION FOR CONSTRAINED DEVICES

(71) Applicants: KONINKLIJKE KPN N.V., The Hague (NL); IMEC VZW, Leuven (BE); UNIVERSITY GENT, Ghent (BE)

(72) Inventors: Isam Ishaq, Ghent (BE); Jeroen Hoebeke, De Pinte (BE)

(73) Assignees: KONINKLIJKE KPN N.V., The Hague (NL); IMEC VZW, Leuven (BE); UNIVERSITEIT GENT, Ghent (BE)

( * ) Notice: Subject to any disclaimer, the term of this patent is extended or adjusted under 35 U.S.C. 154(b) by 231 days.

(21) Appl. No.: 14/655,494

(22) PCT Filed: Dec. 27, 2013

(86) PCT No.: PCT/EP2013/078055
§ 371 (c)(1),
(2) Date: Jun. 25, 2015

(87) PCT Pub. No.: WO2014/102327
PCT Pub. Date: Jul. 3, 2014

(65) Prior Publication Data
US 2015/0358430 A1    Dec. 10, 2015

(30) Foreign Application Priority Data
Dec. 28, 2012   (EP) ..................................... 12199571

(51) Int. Cl.
G06F 15/16   (2006.01)
H04L 29/06   (2006.01)
H04L 29/08   (2006.01)

(52) U.S. Cl.
CPC .............. *H04L 67/42* (2013.01); *H04L 67/12* (2013.01); *H04L 67/303* (2013.01)

(58) Field of Classification Search
USPC .................................................. 709/203, 224
See application file for complete search history.

(56) References Cited

U.S. PATENT DOCUMENTS

| 2011/0268047 A1* | 11/2011 | Nath ..................... H04W 4/005 370/329 |
| 2012/0197852 A1 | 8/2012 | Dutta et al. |
| 2013/0227114 A1* | 8/2013 | Vasseur ................. H04L 41/044 709/224 |

OTHER PUBLICATIONS

Notification of Transmittal of the International Search Report and the Written Opinion of the International Searching Authority, PCT/EP2013/078055, dated Apr. 2, 2014.
European Search Report, EP 12199571.6, dated Apr. 17, 2014.

* cited by examiner

*Primary Examiner* — Wing F Chan
*Assistant Examiner* — Joseph Maniwang
(74) *Attorney, Agent, or Firm* — Hamilton, Brook, Smith & Reynolds, P.C.

(57) ABSTRACT

A method for creating a profile for accessing or manipulating resources across a plurality of nodes in a network is disclosed. An entity manager receives a request from a client to create a profile, and preferably validates the request. The entity manager generates said profile and the profile is addressable by a profile identifier. A client may use the profile to interact with the resources across the plurality of nodes using the profile identifier.

17 Claims, 16 Drawing Sheets

ENTITY CREATION FOR CONSTRAINED DEVICES

This application is the U.S. National Stage of International Application No. PCT/EP2013/078055, filed Dec. 27, 2013, which designates the U.S., published in English, and claims priority under 35 U.S.C. §§119 or 365(c) to European Application No. 12199571.6, filed Dec. 28, 2012.

FIELD OF INVENTION

The disclosure generally relates to the field of constrained nodes or devices accessible over a network. In particular, though not necessarily, the disclosure relates to methods, an entity manager, systems, and a computer program product for creating profiles for interacting with an entity, which groups, e.g., resources across a plurality of constrained nodes.

BACKGROUND

Devices, such as constrained devices, sensors and actuators, deployed as a network of nodes have become useful for collecting and/or process data in applications such as ambient intelligence, smart environments, and autonomous control. For example, networked sensors may be deployed in a building to measure the temperature and humidity such that an air conditioning system for the building may be adjusted autonomously. These networked devices are generally referred to as constrained nodes or constrained devices in a (constrained) network, and each constrained node generally has at least one resource such as temperature or humidity. The nodes may be accessible, e.g., in an Internet-like network, where each device is a uniquely identifiable node, and the nodes act as servers to which clients can connect. Such a system of nodes may be referred to colloquially as "Internet of Things". The nodes may be in a wired network and/or a wireless network. In some situations, these nodes are constrained nodes or constrained devices, having limited power and computing resources. The network that connects these nodes may be referred to as low power and lossy networks (LLNs). Typically, each of the nodes has at least one resource. A resource may be associated with a state of the node and/or information associated with the node, or with an action that can be executed on the device. Examples of resources include: "/temperature", "/humidity", "/room_location", "/picture", "/light_control", etc. Clients may query the node for the resource at the node.

Depending on the application, information from individual nodes might not be sufficient, reliable, or useful. An application may need to aggregate and/or compare data from a plurality of nodes. In some cases, an application may need to perform an operation on a plurality of nodes using a single request. Although multicast may be used to transmit the same request to a plurality of nodes, multicast communication in LLNs has some disadvantages. For instance, it is difficult to avoid duplication of messages, and duplication is undesirable in an LLN where bandwidth is limited for these constrained nodes. Furthermore, multicast is not reliable in an LLN, which is problematic for requests that require guaranteed delivery. Also, the creation of multicast groups, defining which nodes should be addressed when using a particular multicast address, is hard to realize in LLNs.

Some unicast-based features have been introduced to alleviate some of the problems above, but the features are insufficient. According to a July 2012 Internet draft description of the Constrained RESTful Environments (CoRE) interfaces, a client may utilize the Linked Batch interface and Bindings. Linked Batch Interface allows a client to manipulate multiple resources at a single node with one client request, and Bindings allows a client to synchronize multiple resources across a plurality of nodes. However, the draft does not provide a unicast-based way to manipulate multiple resources of a plurality of nodes with a single request.

To overcome this problem, (user) applications running on clients have added intelligence and programming to access each node individually to aggregate and/or compare data from a plurality of nodes. This leads to more complex (user) applications, and the added intelligence and programming cannot be shared with other applications easily. Furthermore, complex user applications may be unwieldy. Any modifications to those complex user applications may require significant testing time, thus limiting the flexibility of the user applications. Additionally, a large overhead of communications between the client and the nodes is generated, especially if many nodes are involved. Costs may become large if the communications are performed over costly links. When the communications between the client and the nodes are performed across the Internet, delays may be unpredictable and a sequence of operations/commands to the nodes may arrive out of order and possible lead to undesirable results.

SUMMARY

To alleviate the problems discussed herein, a method, performable by an entity manager, for creating a profile for a accessing a plurality of resources across a plurality of nodes in a network is disclosed. Generally speaking, an entity comprises and/or groups a plurality of nodes, e.g., the plurality of resources and/or capabilities across the plurality of nodes. A profile is created for such an entity, and the profile typically describes the entity (e.g., the nodes, resources, and/or capabilities grouped by said entity) and optionally operation(s) for interacting with the plurality of nodes. An entity manager is configured to create and manages profiles for at least one entity. Through the entity manager, the client is configured to interact with the entity using a (single) profile created for the entity, and thereby interact with, e.g., the plurality of resources and/or capabilities across the plurality of nodes without having to interact with the nodes individually and separately.

Each node is associated with a node identifier, e.g., to uniquely address the node. Each node is configured with at least one resource and at least one capability. Generally, a node may include a device such as a sensor, an actuator, etc. Typically, the node may include a constrained device. A resource of a node may have information associated with that node and/or has a state associated with that node. A node having different measuring sensors such as a temperature sensor and a humidity sensor may be considered a node with resources including "/temperature" and "humidity". A battery-powered node may be considered a node with a resource "/battery_level" or any suitable resource for revealing the node's battery level. A node located at a particular room in a building may be considered a node with a resource "/room_number" or any suitable resource which reveals information associated with the node. In some cases, a resource is associated with an action that can be executed on the node (e.g., such as turning on a light, or adjusting a setting of an air conditioner). A node capable of switching on or off the light may be considered as a node with a resource "/light_control". A node may be configured with certain capabilities, which may enable a node to respond to certain types of client requests and/or perform certain actions.

A first request (or at least one first request) to create the profile for an entity is received at an entity manager from a client. The first request includes the node identifiers of the nodes. The entity manager then generates a profile according to the first request. The profile is generated for entity, which includes a plurality of nodes. Because a profile provides access to resource(s) and/or capability(-ies) across the plurality of nodes, the profile may be a virtual resource (which exists at the entity manager) that is usable by clients for (virtually) interacting with the plurality of resources across the plurality of nodes. In general, a profile comprises at least part of the information for interacting with the plurality of nodes. Said information may include a description of the plurality of nodes, e.g., the identity of the nodes and the resource(s) and/or the capability(-ies) that are available for the profile (i.e., resources and/or capabilities associated with the plurality of nodes). For instance, the information may include identifiers for the nodes and/or identifiers for the resource(s) and/or capability(-ies) of the nodes such that the entity manager may communicate or interact with the nodes of the profile. Identifiers may include a Uniform Resource Identifier (URI).

In some embodiments, the profile includes an operation used for interacting with the nodes and optionally parameters for said operation. In general, an operation may define certain request(s)/query(-ies), the manner of executing request(s)/query(-ies) and/or the manner of processing response(s) from the nodes. Typically, the operation may specify capability(-ies) available for the profile, descriptions of how to execute request(s)/query(-ies), and descriptions(s) of how to process response(s) from the nodes (e.g., function(s) for processing responses). At least a part of the operation may be associated with the profile. To interact with the plurality of nodes, the profile includes at least the node identifiers.

The profile is addressable by a profile identifier, and in some cases, the profile identifier may be stored as part of the profile. For instance, the profile identifier includes an identifier to the profile, e.g., as a (virtual) resource, which enables a client to interact with the entity, and thereby the plurality nodes grouped by said entity. This profile identifier is usable by a client to use the profile, e.g., calling upon or invoke the profile to access the plurality of resources across the plurality of nodes. By creating a (virtual) profile for grouping a plurality of resources across a plurality of nodes, a client may easily interact with the nodes at a later time using a (single) request which refers to the profile identifier, e.g., rather than interacting with the individual nodes separately (i.e., the plurality of node identifiers). Furthermore, a profile enables a client to define and customize the profile by changing the resource(s), capability(-ies), and/or the operation(s) that the profile may support.

A first response may be transmitted from the entity manager to the client, e.g., upon creating the profile for the entity. The first response indicates to the client that the profile has been created. The response may provide the profile identifier, e.g., if the profile identifier was not provided by the client in the first request. The client is then enabled to interact with the entity (i.e., the nodes) by referencing the profile identifier to the entity manager.

The profile provides a form of abstraction or an interface for interacting with an entity having a plurality of nodes, and the abstraction advantageously promotes flexibility and reuse of the profile by clients. Profiles also provide ease of client applications to build robust and more complex applications, e.g., by making use of a plurality of profiles in an application. By providing an interface, the profile shields the nodes themselves from being grouped or manipulated in a wrong or unsuitable way, and provides an interface which allows a client to interact with a plurality of nodes in more assured or validated manner.

A profile identifier can be reused by other clients if the other clients have knowledge of and access to the created profile identifier. The entity manager rather than the client may advantageously validate a profile (e.g., using a profile manager) during profile creation and/or modification, and furthermore, manage the communications between the entity manager and the nodes, thereby alleviating the client from the burden of interacting with the plurality of nodes separately.

According to one aspect, the entity manager verifies that the node identifiers in the first request correspond to existing nodes in the network. Advantageously, this ensures the validity/integrity of the profile to be generated. In some cases, this verification shields a client from using a profile that is defective.

According to one aspect, the entity manager determines a first set of at least one resource associated with a first one of the plurality of nodes and a second set of at least one resource associated with a second one of the plurality of nodes. At least one common resource present in the first set and the second set is determined. The entity manager associates the profile with the at least one common resource. Advantageously, this step generates a profile having common resources across the plurality of nodes without requiring the client to specify which resource(s) is to be retrieved across these nodes. Furthermore, the client is no longer required to know which resources are shared or common among the nodes, because the entity manager determines that information for the client, e.g., during the generation of the profile.

According to one aspect, the entity manager determines a third set of at least one capability associated with a first one of the plurality of nodes and a fourth set of at least one capability associated with the second one of the plurality of nodes. At least one common capability present in and/or at least partly supported by both the third set and the fourth set is determined. The entity manager associates the profile with the at least one common capability. Similarly for the resources, the entity manager advantageously provides a common capability which can be executed exactly the same across the nodes or is at least supported by another (different) capability on at least some of the nodes (when the request to create the profile does not specify a particular capability for the profile).

According to one aspect, the first request (or the at least one requests) (1) further comprises an operation or (2) is associated with an operation by default at the entity manager. An operation enables the client to advantageously specify or imply how to interact with the plurality of nodes, e.g., how to aggregate responses from the plurality of nodes. The entity manager verifies that the nodes are able to support the operation based on the at least one resource and/or the at least one capability associated with the plurality of nodes. If the nodes are able to support the operation, the entity manager associates the profile with the operation. The operation associated with a profile enables more complex ways of interacting with the entity (i.e., the nodes grouped by said entity), e.g., to combine responses from a plurality of nodes of the profile in a specific manner or to describe how the entity manager should interact with the plurality of the nodes. This feature is particularly useful for offloading some of the processing to the entity manager from the user application and to leverage abstraction to create even more complex user applications using profiles. Since the aggregation of responses and the interaction with a larger number of nodes at one time have grown to become of importance in the domain such as in the "Internet of Things", the ability to aggregate responses easily and flexibly and the ability to define how to interact with the plurality of nodes using profiles are useful.

According to one aspect, the first request (or the at least one requests) to create a profile for an entity comprises at least one resource associated with each of the node identifiers in the first request. Including the resources or references to the resources advantageously allows the clients to specify which resources to interact with for the profile. The at least one resource associated with each of the node identifiers could be the same, or alternatively, could be different for each of the node identifiers. This advantageously provides flexibility in constructing the profile. Optionally, the method further comprises verifying that the at least one resource associated with each of the node identifiers exist on the nodes identified by the node identifiers. This advantageously ensures the validity of the profile.

According to one aspect, the entity manager determines at least one corresponding request for performing at least a part of the operation. Depending on the operation, the entity manager may optionally translate the operation into the at least one corresponding request based on a rules database associating operations with corresponding requests for performing the associated operations. By allowing the entity manager to translate a particular operation to corresponding requests, it alleviates the burden on the user application to determine those corresponding requests (as a result, user applications are simpler). Optionally, the entity manager verifies that the plurality of nodes support the at least one corresponding request based on the at least one resource and/or the at least one capability associated with the plurality of nodes. This advantageously ensures the validity of the profile.

According to one aspect, the entity manager receives a second request comprising the profile identifier from the client and optionally an instruction for the entity to perform an operation. The operation may be an operation, e.g., out of a set of previously defined operations that are supported by the profile. In some cases, the operation may be an operation to be verified by the entity manager whether the operation can be or is supported by the profile. Such a request invokes the profile to be used, and enables the client to interact with a plurality of nodes using the profile and according to the operation indicated in the request. The entity manager, e.g., transmits the at least one of the corresponding request associated with the operation to (at least some of) the nodes. The entity manager receives at least one response to the at least one corresponding request at the entity manager from the (at least some of) the nodes. The entity manager derives a second response in accordance with the operation by processing the at least one response from the at least some of the nodes. The entity manager then transmits the second response to the client. The entity manager carries out the operation indicated in the request to advantageously aggregate responses from the nodes and provide an aggregate response to the client.

According to one aspect, the entity manager transmits at least one corresponding request to only a subset of the nodes to perform at least part of the requested operation. This feature of avoiding communication with some of the nodes advantageously allows some nodes to sleep (e.g., to conserve battery life on a constrained node). The aggregated response from the nodes may be more tolerant of the situation where some node(s) are not able to transmit a response to the entity manger or the entity manager is not able to receive a response from the node at the time (e.g., due to computational inabilities or network problems). Such failures may be handled more gracefully through the profile.

According to one aspect, the first request (or the at least one request) to create the profile for the entity, said request (1) comprises an operation or (2) is associated with an operation by default. Said operation is associated with at least one corresponding request, and said first request further comprises at least one of the following parameters for parameterizing the operation: (1) a first parameter for indicating whether the at least one corresponding request is confirmable or non-confirmable, (2) a second parameter for indicating a number or all of the nodes to which the at least one corresponding request is transmitted, (3) a third parameter for indicating a minimum number or all of the nodes from which a response to the at least one corresponding request must be received before responding to a request to perform the operation. In a different aspect, the parameters may alternatively or additionally be used to specify the operation when using the profile (i.e., after the profile has been created). Advantageously, parameters enable more complex operations to be performed and provide more flexibility to the client to define or specify operations for creating and/or using a profile.

According to one aspect, deriving a second response (i.e., the aggregate response) may include at least one of the following: (1) compiling all of the at least one response to a list and the second response comprises said list, (2) determining a minimum value from the at least one response and the second response comprises said minimum value, (3) determining a maximum value from the at least one response and the second response comprises said maximum value, (4) determining an average value from the at least one response and the second response comprises said average value, and (5) determining a sum of values from the at least one response and the second response comprises said sum of values. Advantageously, profiles enable different ways of aggregating responses across a plurality of nodes to produce a meaningful response for the user application on a client.

According to one aspect, a third request is received at the entity manager. The third request comprises the profile identifier and a change to the profile (or a new specification for the profile). The entity manager updates the profile for the entity at the entity manager based on the change to the profile. The entity manager advantageously provides an interface for clients to flexibly update/change profiles. For instance, the third request may add/remove/replace the nodes grouped by the entity by changing the profile for said entity.

According to one aspect, the first request (or the at least one request) further comprises the profile identifier to be attributed to the profile and the method further comprises associating the profile identifier with the profile. This aspect advantageously allows a client to specify the profile identifier. This feature enables the profile identifier to be defined using a human-friendly name, which may facilitate humans to program interactions with the profile. According to an alternative aspect, the entity manager generates the profile identifier, associates the profile identifier with the profile, and transmits the profile identifier to the client. This aspect alleviates the burden on the client to attribute the profile identifier.

According to one aspect, at least one of the plurality of nodes comprises a constrained device. When a profile is created for constrained device(s)s, the single profile enables a client to interact with the plurality of devices. The advantages of the disclosed embodiments are particularly evident for constrained devices, which are often not suitable candidates for coordinating with other constrained devices, and/or perform an operation specified in the profile.

According to another aspect, at least one of the plurality of nodes is communicably connected to the entity manager over a low power and lossy network. In these situations, the entity manager may advantageously handle issues that arise from the low power and lossy network gracefully by being an intermediary between the client and the plurality of nodes (thereby shielding the client from issues in the low power and lossy network).

An entity manager for creating a profile for a group of nodes in a network is disclosed. Each node is associated with a node identifier and is configured with a set of capabilities. The entity manager comprises a receiver, a profile manager, and transmitter. The receiver is for receiving, at an entity manager, a first request (or at least one first request) to create the profile from a client, said first request (or said at least one first request) comprising the node identifiers. The profile manager is for generating, manipulating and using the profile, said profile comprising the list of node identifiers, wherein the profile is addressable by a profile identifier. The transmitter is for optionally transmitting a first response from the entity manager to the client. The response indicates that the profile has been created at the entity manager. The entity manager is also configured to implement any of the methods disclosed herein.

A system comprising a plurality of nodes in a network and the entity manager for creating a profile for accessing the resources of the plurality of nodes is disclosed. Said entity manager communicably connected to the plurality of nodes, or is implemented at least one of the plurality of nodes.

The disclosure may also relate to a computer program product, implemented on computer-readable non-transitory storage medium, wherein the computer program product may comprise software code portions configured for, when run a computer, executing the method steps according to any of the methods described in the present disclosure. The computer program product is preferably implemented at least in part in any of: a node, an entity manager, a profile manager, an intermediary, a storage, a transmitter, and a receiver, etc.

The disclosure will further be illustrated with reference to the attached drawings, which schematically show embodiments according to the disclosure. It will be understood that the disclosure is not in any way restricted to these specific embodiments. Hereinafter, embodiments of the invention aiming to alleviate the problem(s) described above will be described in further detail. Moreover, combinations of any of the embodiments and limitations are envisioned by the disclosure.

BRIEF DESCRIPTION OF THE DRAWINGS

Aspects of the invention will be explained in greater detail by reference to exemplary embodiments shown in the drawings, in which.

DETAILED DESCRIPTION

Figure 1:
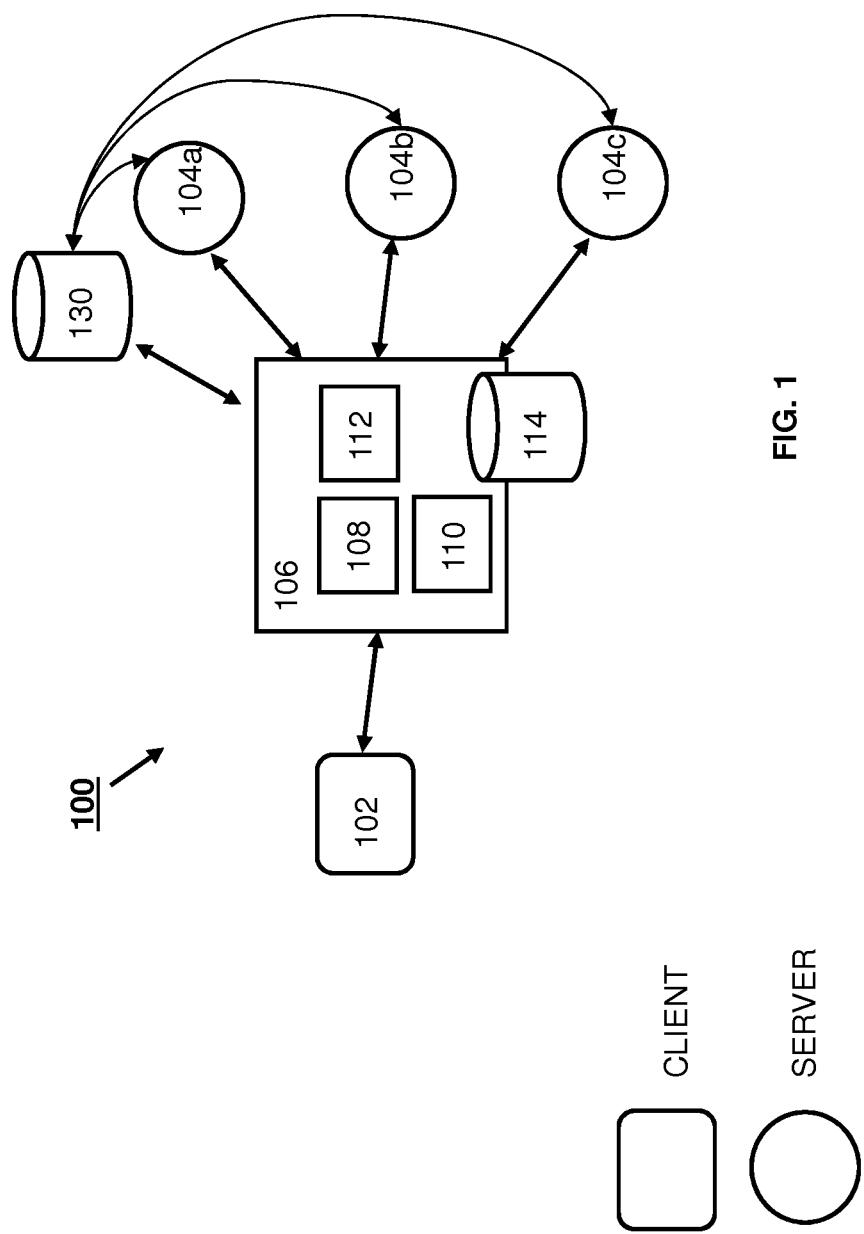
FIG. 1 shows an exemplary system comprising a client, a plurality of nodes, and an entity manager, according to one embodiment of the disclosure.

FIG. 1 shows an exemplary system comprising a client, a plurality of nodes, and an entity manager, according to one embodiment of the disclosure. System 100 comprises a client 102, a plurality of nodes 104a-c, an entity manager 106, and a resource directory 130. The client may include (user) applications configured to transmit requests to nodes acting as servers. Each node is associated with a node identifier (such as an address of the node in a network), at least one resource, and/or at least one capability. The clients may request information regarding resource(s) on a node, and/or to request the node to perform an action according to the capability(-ies) of the node. The nodes may be constrained nodes acting as a server for one or more clients. Although only three are shown, any number of nodes (at least two) are envisioned.

The client is communicably connected to the entity manager over a wired or wireless (or a combination of both) communication network, and the entity manager is communicably connected to the nodes over a wired or wireless (or a combination of both) communication network. In some cases, the communication network to which the nodes are connected is lossy and/or unreliable. Generally, the client is configured to access the entity manager and/or the nodes through a server-client relationship, using a protocol such as Constrained Application Protocol (CoAP) to access and/or manipulate resources located at the entity manager and/or the nodes by the client.

The entity manager includes a receiver 108, a transmitter 110, a profile manager 112, and a storage 114. The receiver is configured to receive communications from clients and/or nodes. The transmitter is configured to transmit communications to clients and/or nodes. The entity manager is configured to create a profile for an entity, which groups the plurality of nodes. More specifically, the profile manager is configured to generate a (validated) profile in response to requests to create the profile for the entity. For instance, the profile manager is configured to validate requests to create a profile, for instance, by determining whether the nodes specified by the request exist in the network. The storage is configured to store profile(s), optionally other data, e.g., operations, any corresponding requests, for supporting operation(s) in a profile, and any functions for processing the responses to the corresponding requests (e.g., functions in accordance with the operation).

The system is configured to implement methods for creating a profile for an entity. A profile enables the client to access resources across the nodes of the entity without querying each node separately. The entity manager, e.g., the receiver of the entity manager receives a request to create the profile from a client. The request includes at least the node identifiers for which the profile is created. The entity manager, e.g., the profile manager, generates the profile for an entity. An entity manager is typically configured to manage profiles for one or more entities. For instance, when a request to interact with an entity using a particular profile is transmitted to the entity manager, the entity manager is configured to determine the suitable information for the particular profile to enable the request to be processed according to the particular profile. One or more profiles is preferably stored in the storage of the entity manager. A profile typically includes a description of the nodes of the entity, and resources and/or capabilities which are available through the profile. In some cases, the profile may include an operation for interacting with the nodes. The storage may store requests associated with operations (i.e., for carrying out at part of the operation).

For instance, the profile includes the node identifiers specified in the request (e.g., in a list). To enable the client (or other clients) to use the profile, a profile identifier is associated with the profile such that the profile is addressable by the profile identifier. The profile identifier may be provided, in some cases, by the client. In some other cases, the profile identifier is assigned by the entity manager (e.g., the profile manager). Optionally, the entity manager (e.g., the transmitter) transmits a response from the entity manager to the client to indicate that the profile has been created at the entity manager. When the entity manager assigns the profile identifier, the response preferably provides the profile identifier to the client.

The system may optionally include (or is communicably connected to) a resource directory 130 for maintaining a directory of nodes and resource(s) and/or capability(-ies) supported by the nodes. Such a resource directory may facilitate discovery of supported resource(s) and/or capability(-ies) in a centralized facility. Nodes may register and/or announce the supported resource(s) and/or capability(-ies) to the resource directory. Entity managers and/or clients may be configured to query the resource directory to determine the resources(s) and/or capability(-ies) supported by a node. In some embodiments, the storage of the entity manager optionally stores its own resource directory of supported resource(s) and capability(-ies) for nodes (e.g., nodes the entity manager had previously interacted with).

Figure 2:
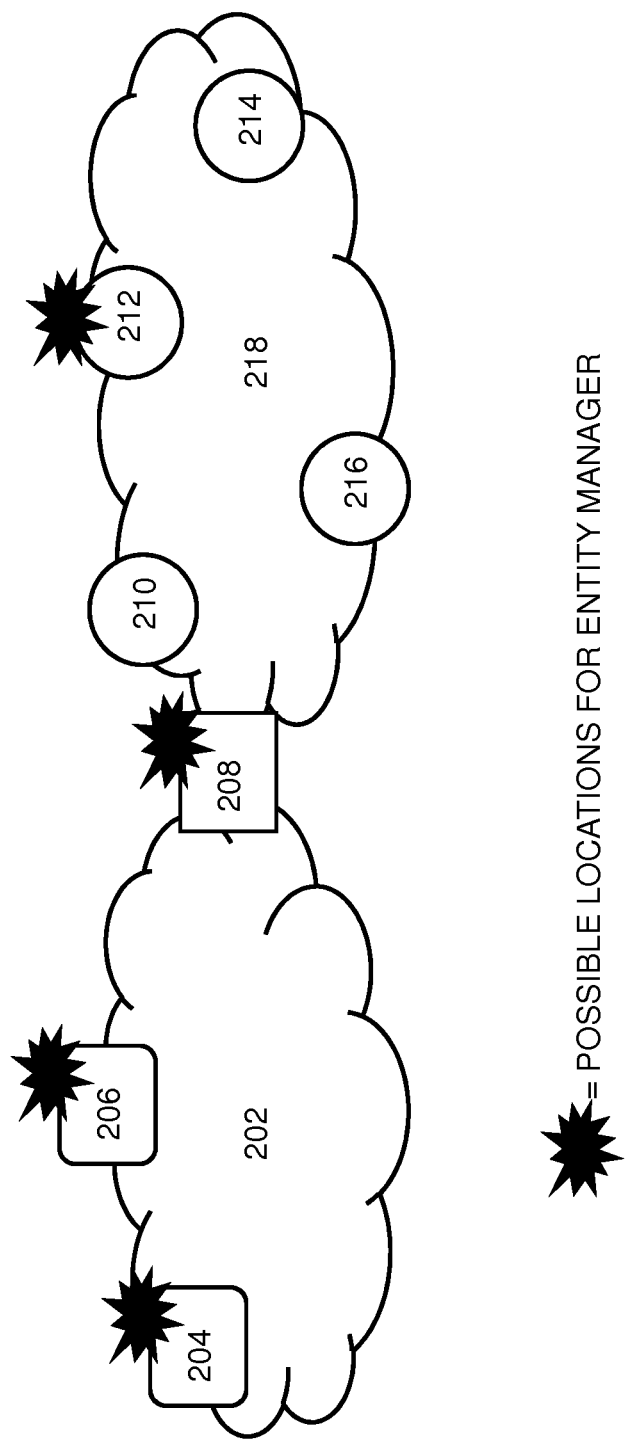
FIG. 2 shows an exemplary system comprising a client, a plurality of nodes, and an entity manager, according to one embodiment of the disclosure.

FIG. 2 shows an exemplary system comprising a client, a plurality of nodes, and an entity manager, according to one embodiment of the disclosure. Generally speaking, the entity manager acts as an intermediary (or an interface) between a client and the entity (i.e., the nodes with whom the client wishes to interact). The functionality provided by the entity manager does not have to be implemented on a dedicated device nor in a particular location in the network. The illustrative system shows a client 204 (e.g., a client device, a user device, etc.) and a server 206 (e.g., a web server, a server in the cloud, etc.) in a first communication network 202. Further, the system shows a plurality of nodes 210, 212, 214, 216 in a second communication network 218. Moreover, the system shows a gateway node 208 located between the first communication network and the second communication network. The entity manager may be implemented (at least in part) at the client, the server, the gateway node, any of the nodes, or any combination of the above.

Preferably, the node in which the functionality of the entity manager can be implemented is a node which has sufficient computational and/or power resources (i.e., preferably not a constrained node having a limited battery life and/or small amount of memory). A gateway node is typically a non-constrained node, and is suitable for handling the load associated with the functionality of the entity manager. Furthermore, the gateway node may provide a centralized location suitable for managing security between clients and the nodes. A server, in some cases, operated by a service provider, may advantageously offer entity management services to clients when the functionality of entity manager is implemented at the server. The client device may also be used for implementing the entity manager. In such a situation, (user) applications running on the client device may become more complex, but such a location for the entity manager may be viable in a small network such as a home network. Advantageously, in this situation, the entity manager functionality may be offered as a library that is readily usable by (user/client) applications. The library reduces the burden of implementing similar functionality at the application.

If the interaction with the plurality of nodes requires short delays and/or orderly responses from the nodes, the entity manager is preferably implemented at the location close to the nodes (e.g., requiring short distances between the entity manager and the nodes). Generally speaking, the optimal location of the entity manager depends on the use case (size and topology of the networks, the availability of a device that can handle the extra functionality as the entity manager).

Regardless of the location of the entity manager in the network, the entity manager may act as a proxy between the client and the nodes. Client requests are transmitted to the entity manager using, e.g., CoAP or HyperText Transfer Protocol (HTTP). The entity manager processes the requests and issues appropriate requests to the nodes, e.g., using CoAP. Once the responses are received from the nodes at the entity manager, the entity manager processes the responses to aggregate the responses, e.g., by applying an operation. The entity manager then provides an aggregated response to the client using the protocol the client used to initiate the request. Advantageously, the entity manager decouples the protocol requirements of the client and the nodes. If the client does not support, e.g., CoAP, it is still able to interact with the nodes through the entity manager using, e.g., HTTP.

Figure 3:
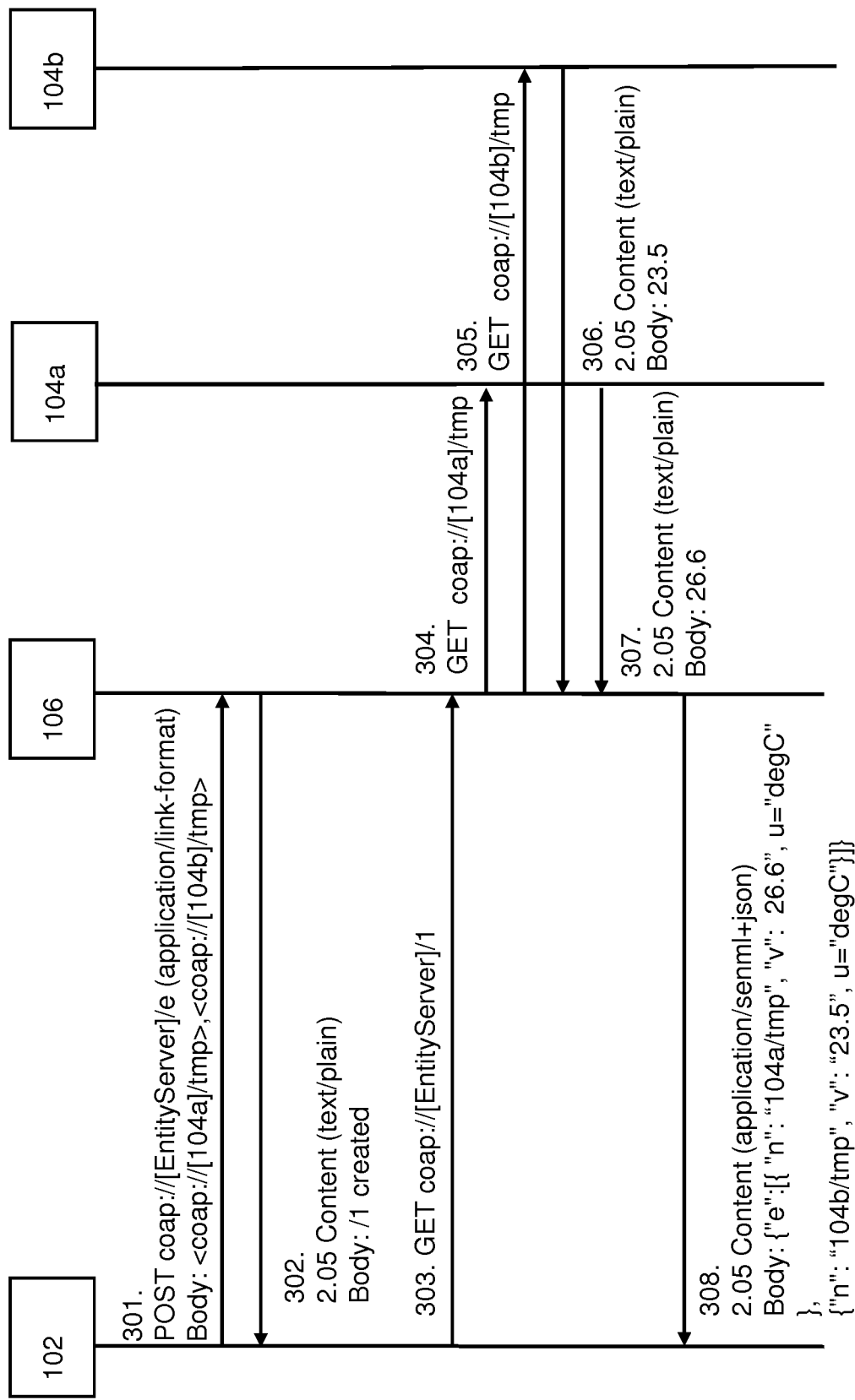
FIG. 3 shows an exemplary messaging diagram illustrating a request to create a profile and a request to interact with the nodes using the profile, according to one embodiment of the disclosure.

FIG. 3 shows an exemplary messaging diagram illustrating a request to create a profile for an entity and a request to interact with the nodes of the entity using the profile, according to one embodiment of the disclosure. Both processes, entity creation and entity query, are illustrated in this figure.

A client 102 first transmits a request to the entity manager 106 to create a profile (step 301) for an entity, wherein the entity groups a plurality of nodes (e.g., node 104a and node 104b). The illustrative request as shown creates a profile at the entity server. The request comprises node identifiers associated with the plurality of nodes: node identifier "104a", and the node identifier "104b". The request further comprises the resources: "/tmp" resource for node 104a, "/tmp" resource for node 104b. Once the profile is created, a response is transmitted to the client indicating the profile has been created (step 302) for the entity. The response includes the profile identifier, e.g. the Uniform Resource Identifier (URI) path "/1". By combining the scheme used to interact with the entityServer, e.g., "coap://", the entity server address, e.g., "[EntityServer]" and the profile identifier, e.g., "/1", all comprised in the response, the complete URI to interact with the profile can be constructed. An exemplary interface for creating (in some cases, updating and/or retrieving) the profile is as follows:

| METHOD | REQUEST CONTENT FORMAT | DESCRIPTION | RESPONSE CONTENT FORMAT |
|---|---|---|---|
| POST | application/link-format or application/json | A POST request may create and/or update a (virtual) resource on the entity manager, i.e., a profile addressable by a profile identifier, that contains the resource collection specified in the POST payload. In the response, the Location-Path CoAP option may be used to specify the URI-path of the newly created resource. | text/plain |
| GET | Not applicable | Not applicable | — |
| PUT | Not applicable | Not applicable | — |
| DELETE | application/link-format or application/json | The DELETE request may delete the specified virtual resource from the server | — |

Using POST is advantageous because the capabilities specified for a desired profile are in the POST body (rather than in the URI), and block transfer may be used to transmit the capabilities even when the capabilities require a relatively large amount of data size.

Further, updating the profile for the entity may be done via a POST request, which includes the existing profile identifier, to this exemplary interface for creating the profile.

Once an profile has been created, a client may interact with the nodes (e.g., get the "/tmp" resources for nodes 104a and 104b) using the profile identifier "/1" as part of the URI-path in the request URI of a GET request and by transmitting this request (step 303). Other methods such as PUT or POST, if allowed by the profile, may be used to interact with entity, i.e., the nodes grouped by said entity.

An exemplary interface for retrieving, updating and deleting the resulting profile is as follows: using the resource .well-known/profile on the entity server followed by the URI query with key "path" and value equal to the profile identifier, e.g. coap://[EntityServer]/.well-known/profile?path="/1" for the embodiment shown, a client may interact with the profile (e.g., using the profile as a virtual resource) as follows:

| METHOD | REQUEST CONTENT FORMAT | DESCRIPTION | RESPONSE CONTENT FORMAT |
|---|---|---|---|
| POST | application/json | The POST request may replace the current profile with a new profile. | — |
| GET | — | The GET request may return the current profile. | application/senml + json |
| PUT | application/json | The PUT request may change individual values (e.g. node identifiers, resources, parameters, etc.) of the profile. | — |
| DELETE | — | The DELETE request may remove the profile. | — |

In the embodiment shown, the entity manager applies a default operation to the GET request referring to the profile "/1", which comprises retrieving values for the resource "/tmp" specified for nodes 104a and 104b, and aggregating the values into a list. In response to the separate GET requests transmitted from the entity manager to nodes 104a and 104b (steps 304 and 305), the respective nodes provides values "23.5" and "26.6" in responses to the entity manager (steps 306 and 307). A combined response (i.e., a response which aggregates the values from the nodes) is provided from the entity manager to the client (step 308).

For illustrative purposes, exemplary data structures for representing a profile at the entity manager are explained. The "/tmp" resource for node 104a, "coap://104a.example.org/tmp", may support the "Uri-Host" (3), "ETag" (4), "Observe" (6), "Uri-Port" (7), "Uri-Path" (11), "Content-Format" (12), "Token" (19) and "Proxy-Uri" (35) capabilities ("cap"). This sensor may support only the "text/plain" (0) content format ("cf"). This will result in the node 104a having the following profile:

```
Res: 2.05 Content (application/json)
{
    "profile":[
        {
            "path":"/tmp",
```

```
        "cap":[3,4,6,7,11,12,19,35],
        "cf":[0]
      },
    ]
  }
```

The "/tmp" resource for node 104b, "coap://104b.example.org/tmp", may support the same capabilities as node 104a except for the observe capability. The supported content formats on this sensor are "text/plain" (0), "application/link-format" (40) and "application/json" (50). Accordingly, node 104b may have the following profile:

```
Res: 2.05 Content (application/json)
{
  "profile":[
    {
      "path":"/tmp",
      "cap":[3,4,7,11,12,19,35],
      "cf":[0,40,50]
    },
  ]
}
```

Based on these two profiles (the resource and the capabilities), the entity manager generates the profile for the entity, which groups the two nodes. The profile includes the capabilities that are supported by both nodes and the content format "text/plain" (0). This profile may be as follows:

```
Res: 2.05 Content (application/json)
{
  "profile":[
    {
      "path":"/1",
      "cap":[3,4,7,11,12,19,35],
      "cf":[0]
    },
  ]
}
```

Figure 4:
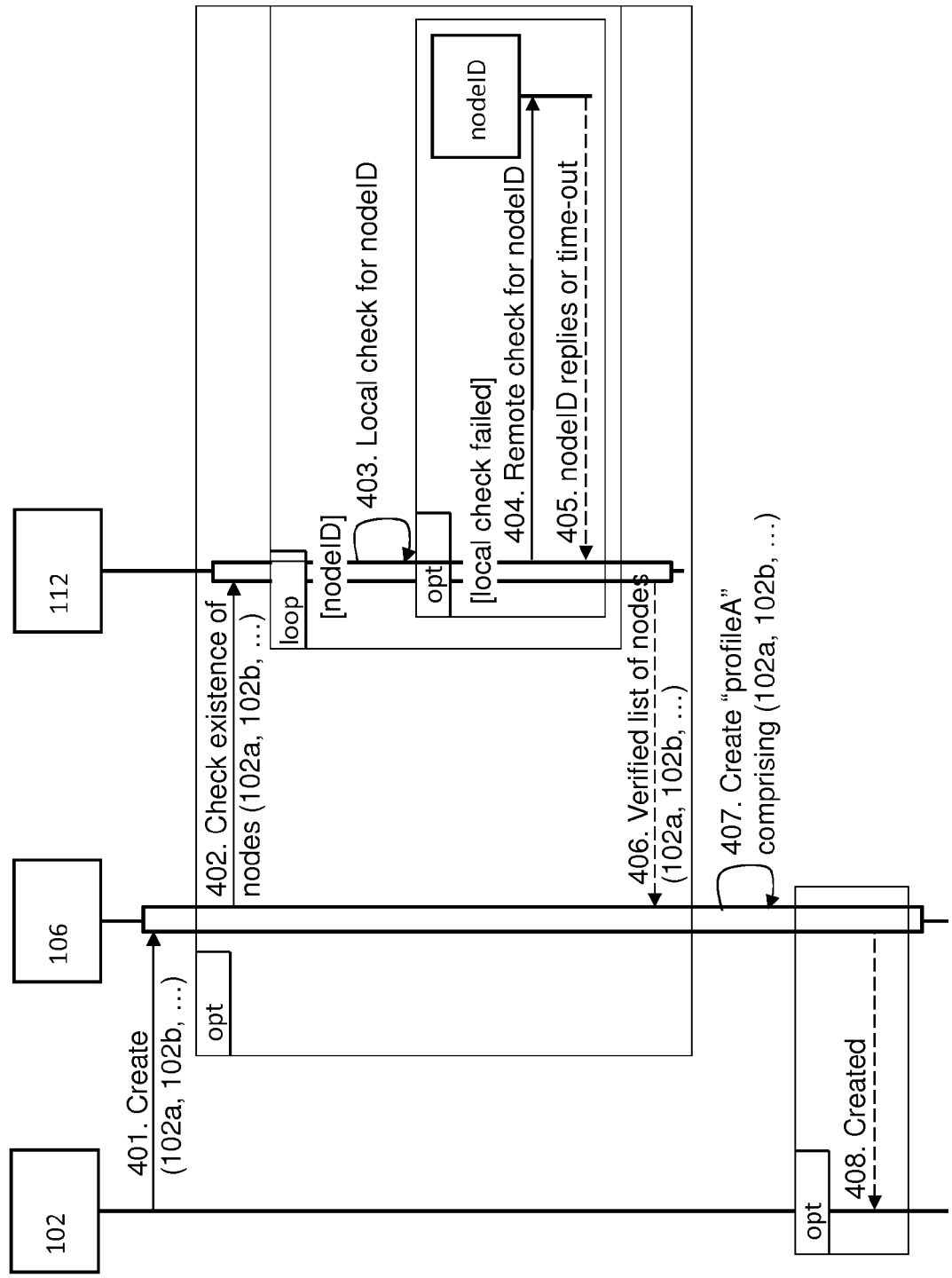
FIG. 4 shows an exemplary messaging diagram illustrating a request to create a profile, according to one embodiment of the disclosure.

FIG. 4 shows an exemplary messaging diagram illustrating a request to create a profile for an entity, according to one embodiment of the disclosure. The entity may group nodes 102a and 102b. A request to create a profile having node identifiers, e.g., "102a" and "102b", is transmitted from a client 102 to an entity manager 106 (step 401). Optionally, the entity manager provides the node identifiers to profile manager 112 (of the entity manager) to validate the request to create the profile by checking the existence of the nodes referenced by the provided node identifiers (step 402). Such a check is performed to ensure the integrity of the profile to be created, ensuring that the information in the profile is valid. The profile manager may check the nodes by iterating through the node identifiers (e.g., using a loop) to check whether the node identifiers correspond to existing nodes in the network (step 403). The check may be performed locally, if the profile manager has a register of valid node identifiers (i.e., node identifiers which refer to existing nodes). The profile manager may query a resource directory to determine if the nodes exist. The profile manager may ping the node using the node identifier provided in the request to determine whether the node identifier refers to an existing node (steps 404 and 405). Upon verification, the profile manager provides a list of node identifier(s), which correspond to existing nodes in the network (assuming at least one of them is valid) (step 406). The entity manager generates the profile comprising the node identifiers (step 407) addressable by a profile identifier, e.g., "/profileA". Optionally, a response indicating the profile has been created is transmitted to the client (step 408). The profile may include the profile identifier.

Figure 5:
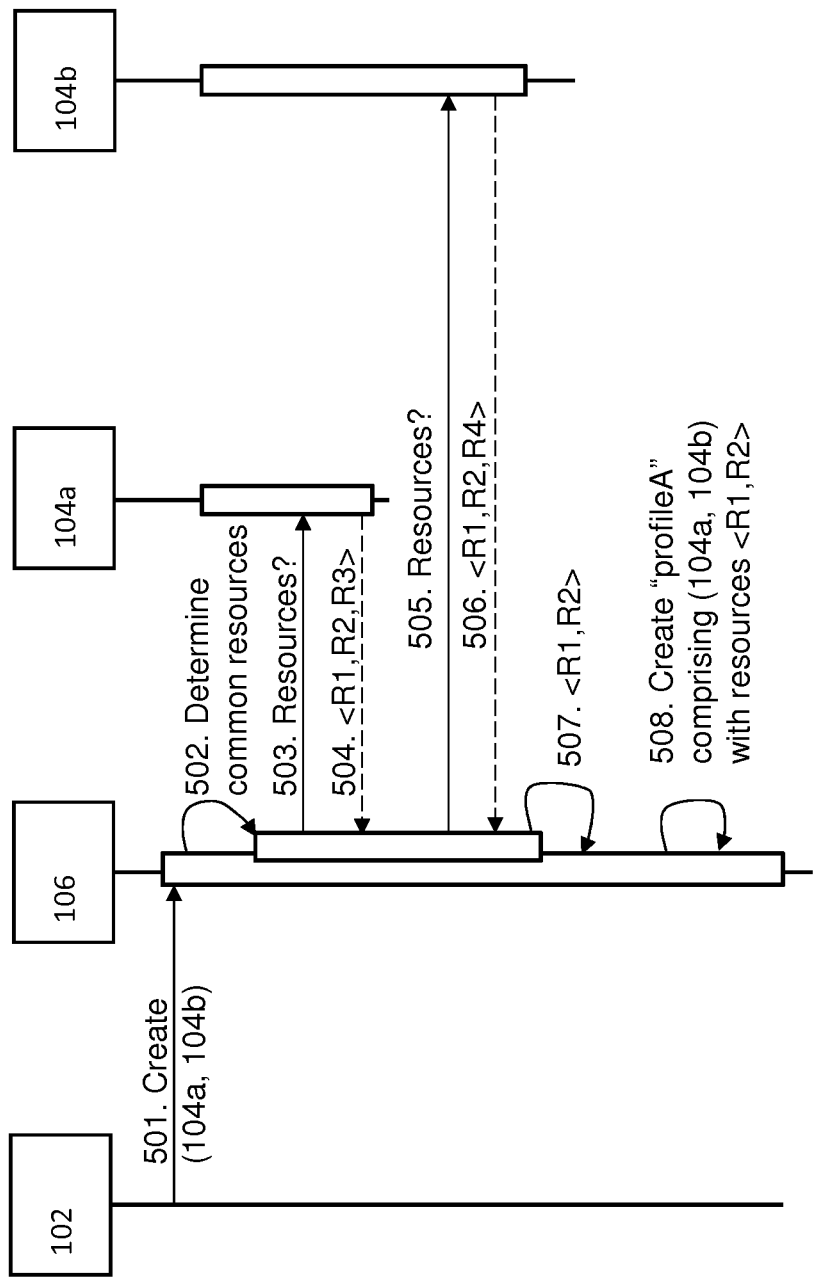
FIG. 5 shows an exemplary messaging diagram illustrating a request to create a profile, according to one embodiment of the disclosure.

FIG. 5 shows an exemplary messaging diagram illustrating a request to create a profile for an entity, according to one embodiment of the disclosure. The entity may group nodes 104a and 104b. A request to create a profile having node identifiers, e.g., "104a" and "104b", is received from the client 102 at the entity manager 106 (step 501). This request to create a profile implies that the client requires a profile created to interact with resource(s) that are common across the plurality of nodes. For instance, the client may request to create a profile to interact with the same type of resource across a plurality of nodes (e.g., to obtain values for the temperature resource from a plurality of nodes). The entity manager generates a profile by determining whether there are any common resources present across the two nodes 104a and 104b (step 502). The entity manager may determine a first set of resource(s) associated by the node 104a (steps 503 and 504), e.g., by querying the node 104a. For instance, the first set of resources includes resource R1, R2, and R3 (e.g., "/temp", "/humidity", "/led"). The same or an alternative method may be applied to node 104b for determining a second set of resource(s) associated by the node 104b (steps 505 and 506), e.g., by querying the node 104b. For instance, the second set of resources includes R1, R2, and R4 (e.g., "/temp", "/humidity", "/switch"). The entity manager determines two common resources present in the first set of resources and in the second set of resources (step 507). For instance, the entity manager determines R1 and R2 (e.g., "/temp" and "/humidity") to be common resources across the nodes 104a and 104b. The entity manager creates a profile and associates the common resources to the profile (step 508). For instance, the profile may be attributed with profile identifier "/profileA" comprising nodes identifiers "104a" and "104b" having (common) resources R1 and R2. The profile may be stored in a storage of the entity manager. In this example, the entity manager may associate a default operation for this profile. For instance, the default operation may correspond to a plurality of GET requests to be transmitted to the nodes to request a common resource and compiling the responses in an aggregated response. Accordingly, if a client requests to interact with the nodes using this profile, the entity manager applies this default operation to obtain values for at least one common resource from the plurality of nodes, and returns the values in a (single) response.

It is envisioned that the client may request to create a profile to interact with all the resources across the plurality of nodes (even though they may not be common across the nodes). In this case, the entity manager may disregard determining common resources. The entity manager may determine and compile all the resources available across all the nodes instead, and generate a profile which, e.g., obtains values from all the resources available on all the nodes.

Figure 6:
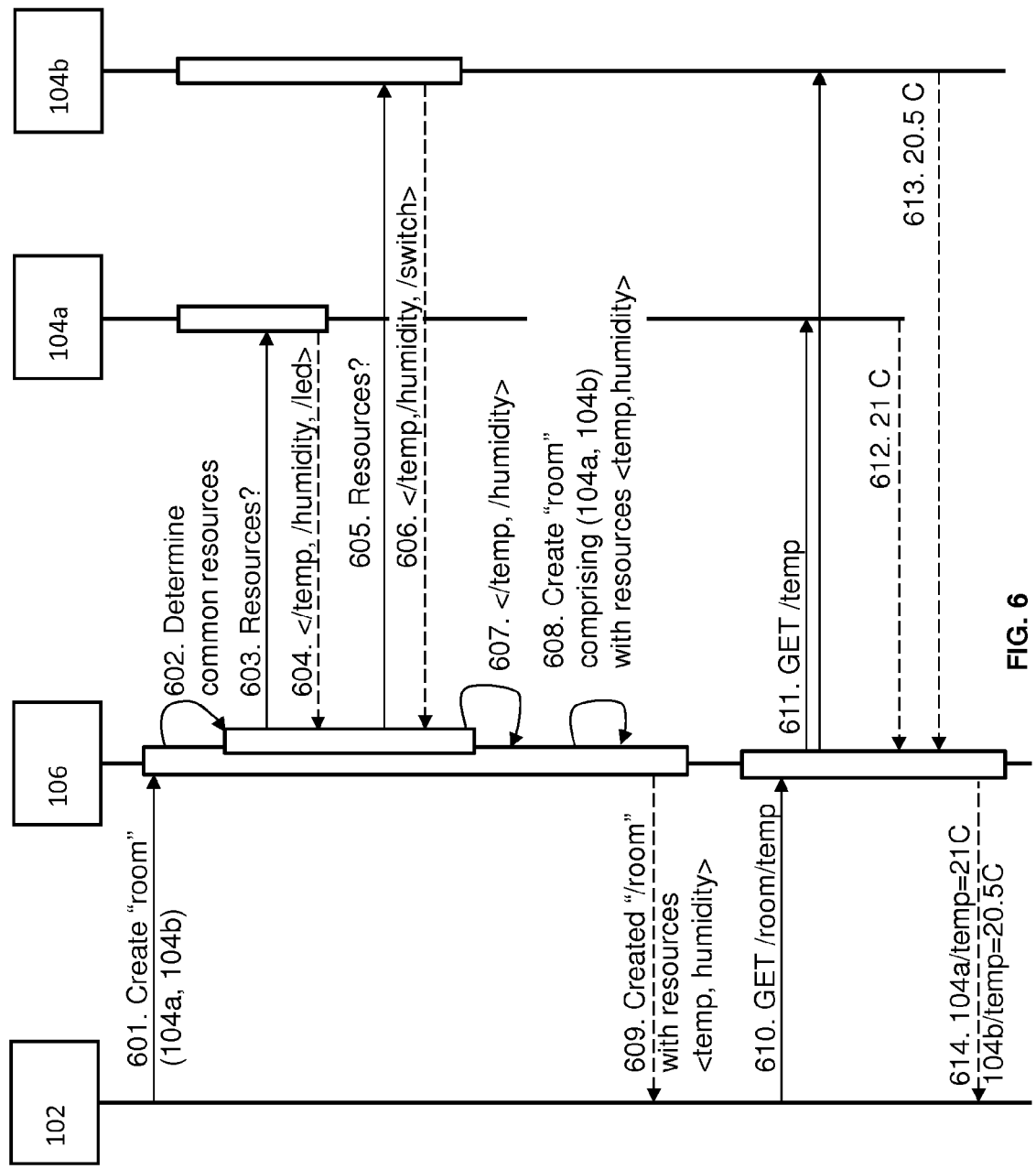
FIG. 6 shows an exemplary messaging diagram illustrating a request to create a profile and to attribute the profile identifier "room", and a request to interact with the nodes using the profile identifier, according to one embodiment of the disclosure.

FIG. 6 shows an exemplary messaging diagram illustrating a request to create a profile for an entity and to attribute the profile identifier "/room", and a request to interact with the nodes of the entity using the profile identifier, according to one embodiment of the disclosure. Steps 601, 602, 603, 604, 605, 606, 607, and 608 show a specific example illustrating steps 501, 502, 503, 504, 505, 506, 507, and 508 of FIG. 5, respectively. In step 601, the client includes in the request a profile identifier "/room". Accordingly, the profile (i.e., the virtual resource) is created at step 608 with the profile identifier "/room" and the profile is addressable by the identifier "/room". Optionally, a response indicating the profile "/room" has been created with the common resources (e.g., "/temp" and "/humidity") is transmitted to the client (step 609).

Using the profile identifier ("/room") in a (GET) request (e.g., GET/room/temp, coap://[intermediary_address]/room/temp, or coap://[intermediary_address]/room/humidity), the client requests the entity manager (step 610) to interact with the entity, i.e., the resources across the plurality of nodes. Optionally, an indicator for the resource (e.g., "/temp") is included in the request if a value for a specific resource is desired. If no indicator for the resource is provided in the request (i.e., the request refers to "/room"), a list of available resources ("/temp" and "/humidity") may be provided in a response to said request. Alternatively, all values for all the resources in the profile may be provided in a response to said request.

Accordingly, the entity manager may perform the default operation, and transmit GET requests to nodes 104a and 104b to obtain values for all the resources of the profile or if the resource is specified (e.g., "/room/temp"), just the values for the specified resource across the nodes (step 611). The entity manager (waits and) receives the values from the nodes (steps 612 and 613). If applicable, the entity manager applies the default operation and simply compiles the values into an aggregate response. A response, e.g., an aggregated response is transmitted to the client having the values received in the responses from the nodes (step 614).

Figure 7:
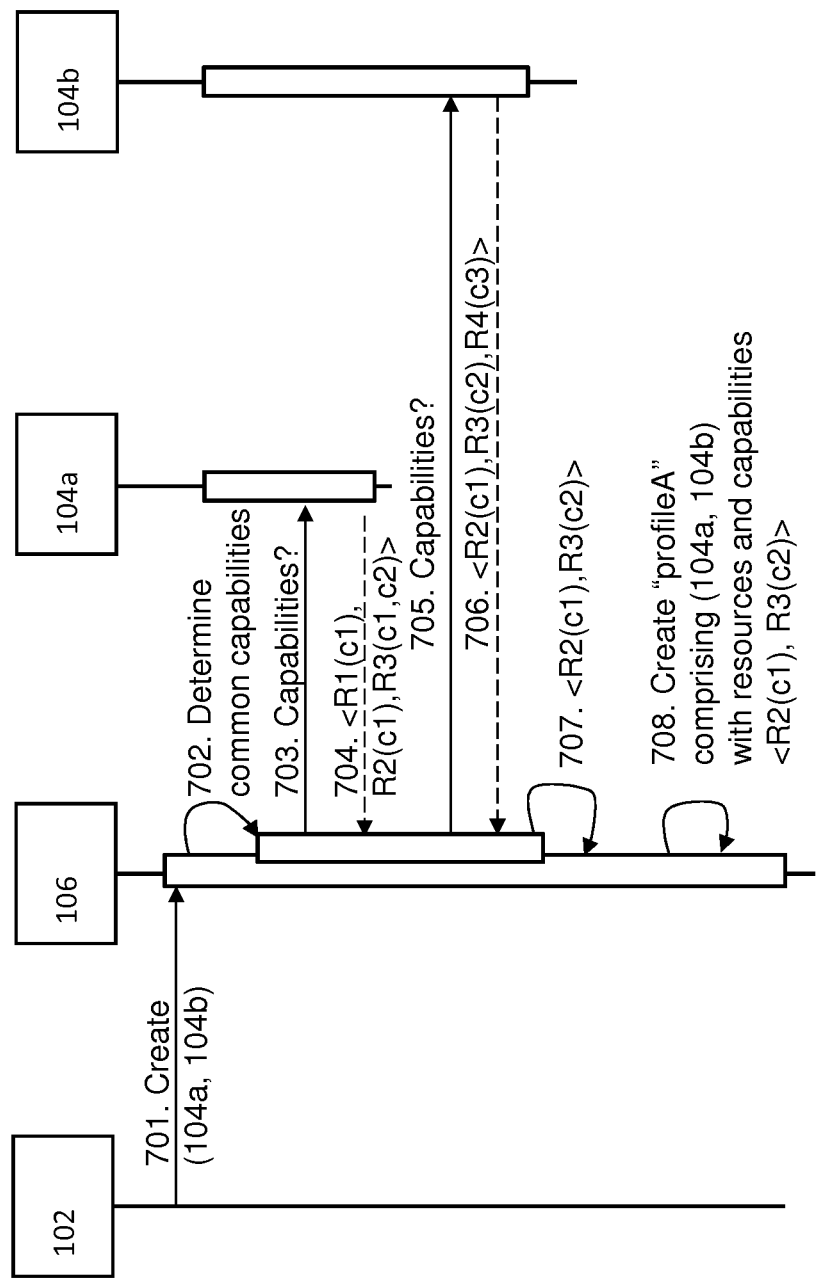
FIG. 7 shows an exemplary messaging diagram illustrating a request to create a profile, and a validation of supported resource(s) and/or capability(-ies), according to one embodiment of the disclosure.

FIG. 7 shows an exemplary messaging diagram illustrating a request to create a profile for an entity, and a validation of supported resource(s) and/or capability(-ies), according to one embodiment of the disclosure. In a more complex situation, the method further determines common capabilities across the plurality of nodes grouped by the entity. A request to create a profile having node identifiers "104a" and "104b" is received from the client 102 at the entity manger 106 (step 701). The entity manager, e.g., the profile manager of the entity manager, may determine at least one common capability(-ies) present by the two nodes 104a and 104b (step 702). The entity manager queries node 104a to determine a first set of capabilities (which may be defined by a resource and the capability(-ies) associated with each resource, e.g., "R1(c1),R2(c1),R3(c1,c2)", R* representing different resources and c* representing capabilities) (steps 703 and 704). The entity manager queries node 104b to determine a second set of capabilities (which may be defined by a resource and the capability(-ies) associated with each resource, e.g., "R2(c1),R3(c2),R4(c3)") (steps 705 and 706). The entity manager determines at least one common capability(-ies) present in both the first set of capability(-ies) and in the second set of capability(-ies) (e.g., "R2(c1),R3(c2)") (step 707). The entity manager creates a profile (optionally attributing a profile identifier, e.g., "/profileA" to the profile) for nodes 104a and 104b and associates the profile with the common capability(-ies) (step 708).

To illustrate, the following are two sets of capabilities supported by nodes 104a and 104b: "t(GET),b(GET),l(obs)" and "b(GET,PUT),l(obs),m(GET)", respectively. "t" represents a temperature resource, "b" represents a button resource, "l" represents a led resource, "m" represents a motion resource. Accordingly, common capabilities include: "b(GET),l(obs)".

Figure 8:
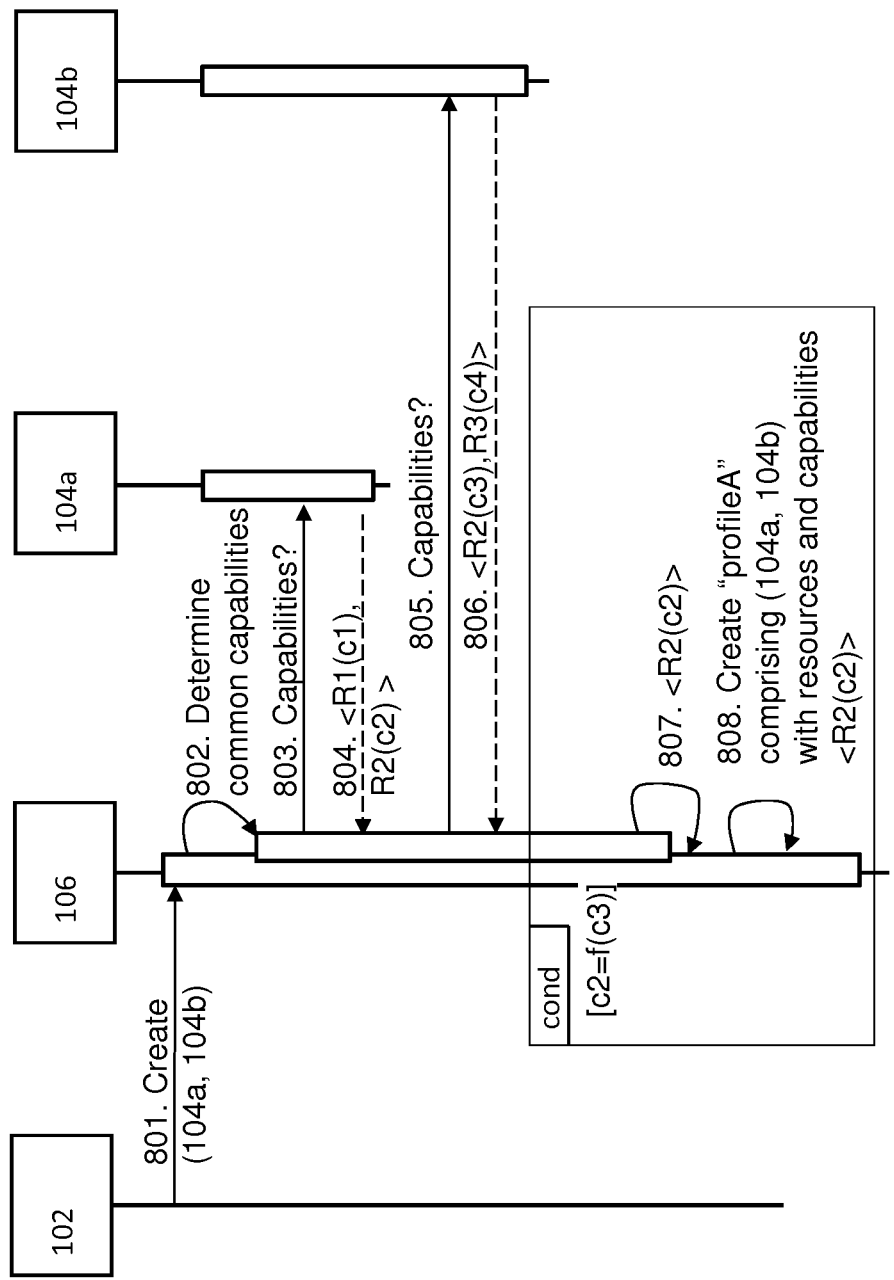
FIG. 8 shows an exemplary messaging diagram illustrating a request to create a profile, and a validation of supported resource(s) and/or capability(-ies), according to one embodiment of the disclosure.

FIG. 8 shows an exemplary messaging diagram illustrating a request to create a profile for an entity, and a validation of supported resource(s) and/or capability(-ies), according to one embodiment of the disclosure In some situations, the common capabilities may be defined to be capabilities that are present in the plurality of sets of capabilities in the same way, as seen in the illustrative example in FIG. 7. Steps 801, 802, 803, 804, 805, and 806 are carried out in a similar manner to steps 701, 702, 703, 704, 705, and 706 of FIG. 7, respectively. In this case, the node 104a returns R1(c1), R2(c2) (step 804) and the node 104b returns R2(c3),R3(c4) (step 806). Both R2 are present as a common resource for the two nodes but the capability for R2 is not exactly the same for the two nodes. If the entity manager knows that R2(c2) can be derivable from R2(c3) based on some transformation c2=f(c3), then the entity manager may determine that R2(c2) as a common capability that is at least partly supported by both the first set of capability(-ies) and the second set of capability(-ies) (step 807). Accordingly, the entity manager creates a profile (optionally attributing a profile identifier, e.g., "/profileA" to the profile) for nodes 104a and 104b and associates the profile with the common capability R2(c2) (step 808).

To illustrate, the following are two sets of capabilities supported by nodes 104a and 104b: "l(plain), t(xml)" and "t(senml+json),m (plain)", respectively. "t" represents a temperature resource, "l" represents a led resource, "m" represents a motion resource. If the entity manager knows that xml=f(senml+json), then common capabilities include: "t(xml)".

Figure 9:
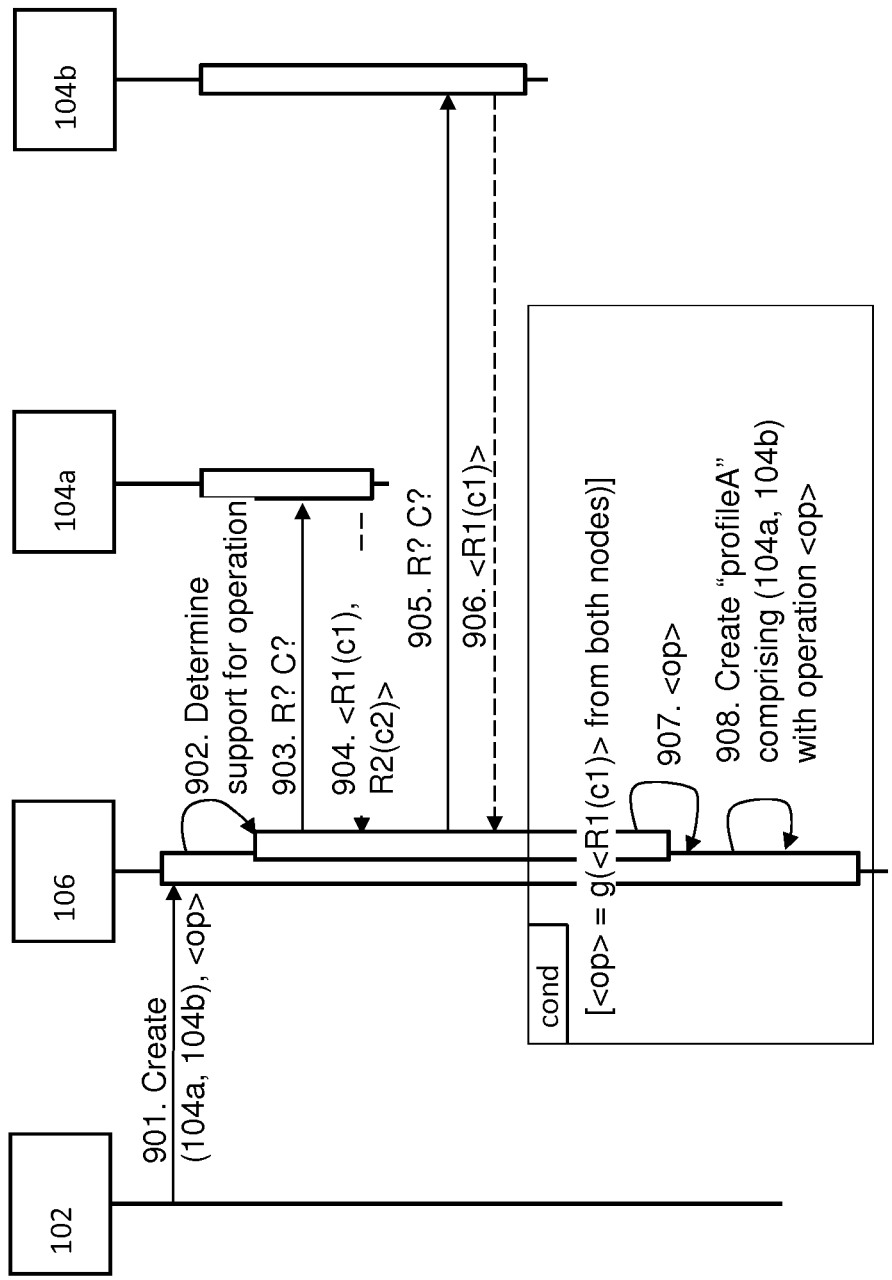
FIG. 9 shows an exemplary messaging diagram illustrating a request to create a profile with an operation, and a validation of supported resource(s) and/or capability(-ies) for the operation, according to one embodiment of the disclosure.

FIG. 9 shows an exemplary messaging diagram illustrating a request to create a profile for an entity with an operation, and a validation of supported resource(s) and/or capability(-ies) for the operation, according to one embodiment of the disclosure. As an option (rather than using a default operation), the request to create a profile may further include an operation "op" (step 901).

Generally speaking, an operation may specify the manner of interacting with the plurality of nodes grouped by said entity. In some embodiments, the profile includes an operation used for interacting with the nodes and optionally parameters for said operation. In general, an operation may define certain request(s)/query(-ies), the manner of executing request(s)/query(-ies), and/or the manner of processing response(s) from the nodes.

The entity manager is configured to verify that the operation indicated in the request to create the profile is supported by the plurality of nodes. For instance, if the operation defines certain request(s)/query(-ies) which is to be supported by the profile or disabled by the profile, the entity manager verifies that the plurality of nodes has the resource(s) and/or capability(-ies) which supports those request(s)/query(-ies). If the operation has corresponding request(s)/query(-ies), then the entity manager verifies that the plurality of nodes supports the corresponding request(s)/query(-ies).

In some embodiments, the operation defines certain request(s)/query(-ies) which is to be made available for the profile. For example, if all nodes support GET and PUT (e.g. light switches), the operation may specify that the profile allows (only) GET. In another example, if all nodes support XML, JSON, plain text, the operation may specify that the profile supports (only) JSON. In another example, if all nodes support observe, the operation may specify that observe is disabled.

In general, an operation may define certain request(s)/query(-ies) for carrying out the operation. For instance, an operation may be associated with and/or define request(s) corresponding to the operation, e.g., request(s) to be issued to the plurality of nodes for carrying out at least a part of the operation. In some situations, the corresponding request(s)

may correspond directly with the operation itself (i.e., the operation has a direct correspondence to a request, e.g., the operation is to observe resources common in the nodes, and the corresponding request is the observe request). In other situations, the operation may not have a direct correspondence to request(s), and the operation may be associated with a function for processing/handling the request(s) and response(s) thereto. For instance, the corresponding requests are subroutine(s) for carrying out the operation (e.g., the operation is to obtain an average of values returned from the nodes and the corresponding request is the GET request). In some other cases, the operation corresponds to request(s) which carries out part of the operation, e.g., the entity manager may carry out the operation by deriving an aggregate response from responses to the corresponding requests (e.g., return average temperature across a plurality of nodes in Celsius and the corresponding requests may include a GET request to return the temperature in Fahrenheit and a GET request to return the temperature in Celsius).

In some embodiments, the operation defines the manner of executing request(s)/query(-ies). For instance, the operation may define that the entity manager should execute a certain type of confirmable requests with the nodes. In another instance, the operation may define that the entity manager should only issue requests to a subset of the nodes.

In some embodiments, the operation defines the manner of processing response(s) from the nodes. The operation may define how the responses from the nodes are processed (e.g., by a function) to generate an aggregated response (e.g., the operation defines that a maximum value out of the values reported is returned). For instance, the operation may define that an average should be calculated from the responses from the nodes. In another instance, the operation may define that only a subset of the responses is reported back to the client.

Furthermore, in some cases the operation may include parameters, which enables further configuration of the operation (e.g., the operation may be parameterized to return only Y number of values, defined by a proportion).

These are merely examples of operations, and other operations are envisioned by the application.

The entity manager determines support for the operation (step 902), by determining whether the resource(s) and/or capability(-ies) supported by the nodes provide support for the operation. For instance, an operation may require the support of certain resource(s) and/or capability(-ies) in the nodes. For instance, "op" may require the support of R1(c1) from both nodes, so that an average may be derived. The entity manager determines the resource(s) and/or capability(-ies) (steps 903, 904, 905, and 906) of nodes 104*a* and 104*b*. For instance, node 104*a* and node 104*b* supports "R1(c1),R2(c2)" and "R1(c1)". Based on the resource(s) and/or capability(-ies) for the nodes, the entity manager determine whether those certain resource(s) and or capability(-ies) needed for the operation is present in (e.g., R1(c1) is present for both nodes) or at least in part supported by the sets of capabilities. If true, then the nodes support the operation (step 907), and the entity manager creates a profile (e.g., having profile identifier "/profileA") for nodes 104*a* and 104*b* grouped by the entity and associates the operation "op" with the profile (step 908).

This example may be modified further if the entity manager knows that c1=f(c2), then if one node supports R1(c1) and another node supports R1(c2), then the operation is also considered supported by the nodes.

Figure 10:
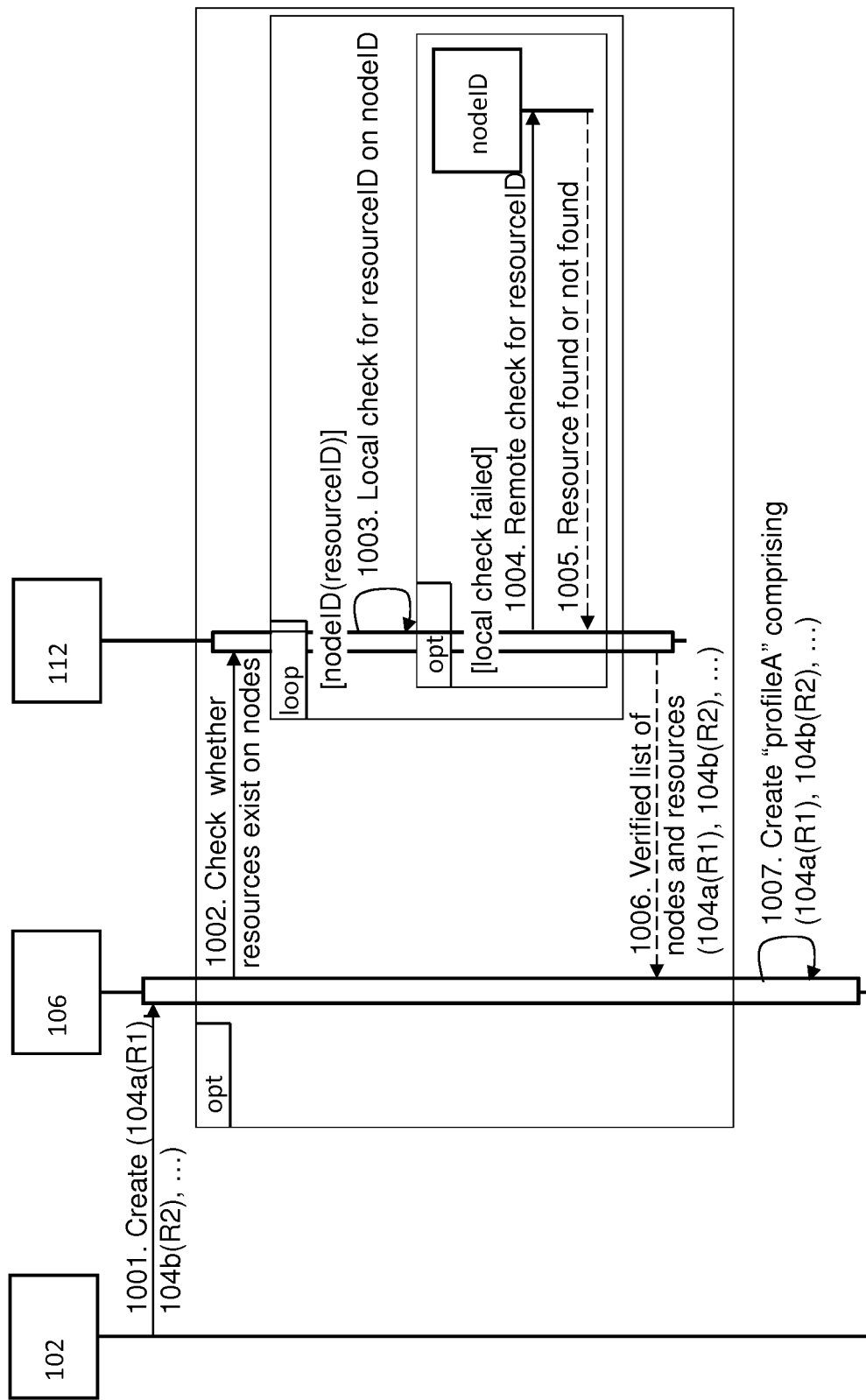
FIG. 10 shows an exemplary messaging diagram illustrating a request to create a profile with specified resources, and a validation of specified resource(s), according to one embodiment of the disclosure.

FIG. 10 shows an exemplary messaging diagram illustrating a request to create a profile for an entity with specified resources, and a validation of specified resource(s), according to one embodiment of the disclosure. A request to create a profile specifying a resource associated with each of the node identifiers (step 1001) from the client 102 to the entity 106. The resources may be the same for every node identifier (e.g., R1=R2=/t) or may be different (e.g., R1=/t, R2=/h). Optionally, the entity manager (e.g., the profile manager of the entity manager) checks whether the specified resources exist on the nodes identified by the node identifiers (step 1002). In one instance, the entity manager may locally check in the storage, whether the entity manager has information that the specified resources exist for these nodes (step 1003). Alternatively, or if the local check failed, the entity manager may iteratively, e.g., through a loop, determine from each of the node associated with the node identifiers exist on the node (steps 1004 and 1005), i.e., whether they are valid resources. Upon verifying the specified resources, a list of valid resources is returned to the entity manager (step 1006). The entity manager generates the profile (optionally attributing the profile identifier "/profileA" to the profile) and associates the valid resources to the profile (step 1007).

Figure 11:
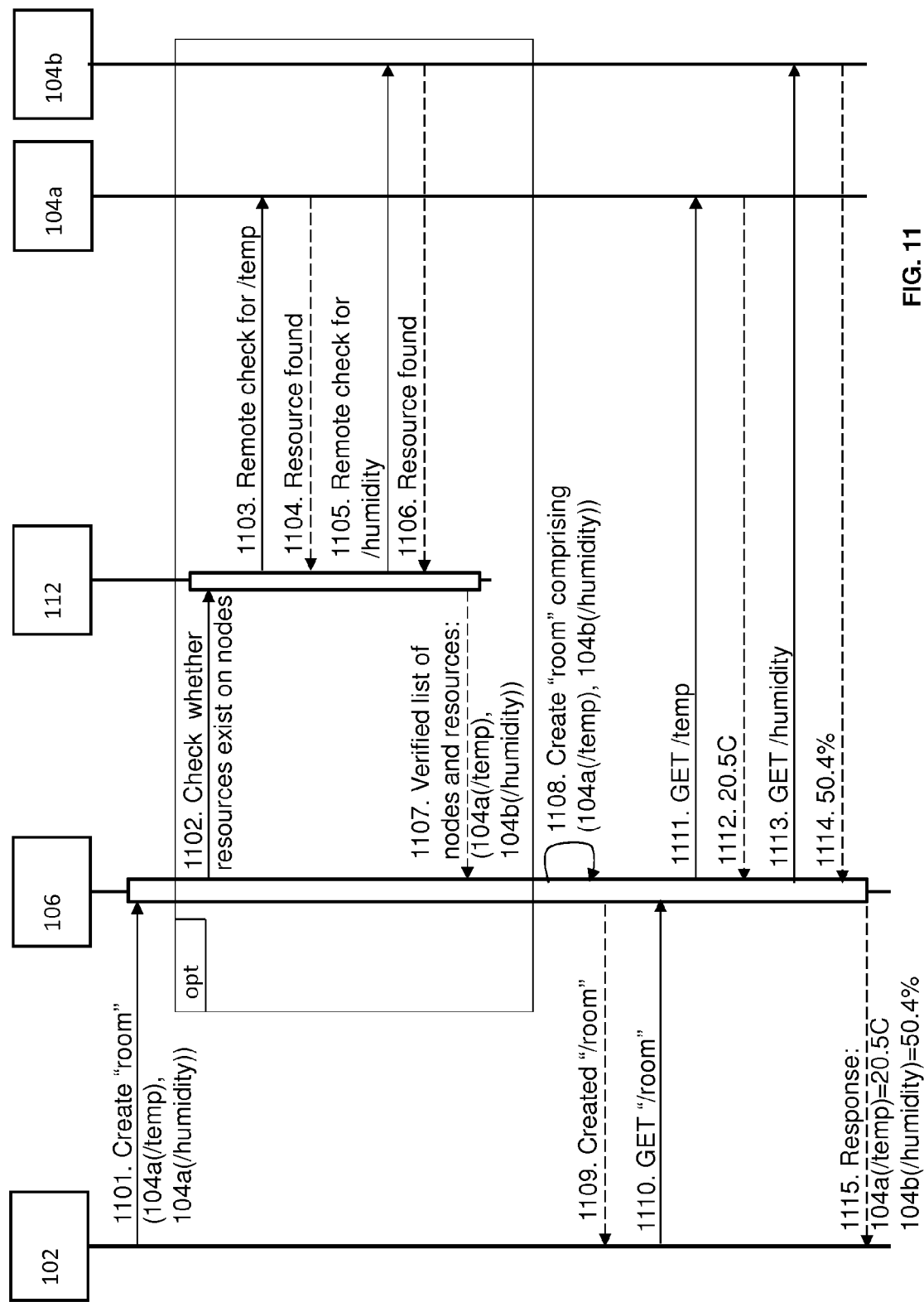
FIG. 11 shows an exemplary messaging diagram illustrating a first request to create a profile with specified resources, a validation of specified resource(s), and a second request to interact with the nodes using the profile identifier "room", according to one embodiment of the disclosure.

FIG. 11 shows an exemplary messaging diagram illustrating a first request to create a profile for a entity with specified resources, a validation of specified resource(s), and a second request to interact with the nodes using the profile identifier "room", according to one embodiment of the disclosure. Steps 1101, 1102, 1107, 1108 are carried out in a similar manner to steps 1001, 1002, 1006, and 1007 of FIG. 10, respectively. Steps 1103, 1104, 1105 and 1106 are iterations expanding steps 1004 and 1005 for nodes 104*a* and 104*b*. In this case, the entity manager receives a request to create a profile for an entity, and the request has a profile identifier "/room" and 104*a*(/temp) and 104*b*(/humidity) as resources for the profile. The entity manager 106 (e.g., the profile manager 112) checks whether the resources exist on nodes 104*a* and 104*b* (steps 1103 and 1105). Nodes 104*a* and 104*b* supports the "/temp" and "/humidity" resources, respectively (steps 1104 and 1106). The verified list of nodes and resources thus includes 104*a*(/temp) and 104*b*(/humidity) (step 1107). Accordingly, the entity manager creates a profile with a profile identifier "/room" for the entity (i.e., nodes 104*a* and 104*b*) and associates the profile with 104*a*(/temp) and 104*b*(/humidity) (step 1108). Optionally, the entity manager transmits a response to the client indicating that the profile with the profile identifier "/room" has been created (step 1109) for the entity.

The client may then transmit a request to interact with nodes 104*a* and 104*b* grouped by said entity to the entity manager using a GET request comprising the profile identifier "/room" (e.g., GET "/room") (step 1110). The entity manager, transmits GET requests for the resources (steps 1111 and 1113) and receives responses (steps 1112 and 1114, respectively) having values for the resources 104*a*(/temp) and 104*b*(/humidity). The entity manager compiles the values (e.g., "20.5 C" and "50.4%") and transmits the values in an aggregated response (step 1115).

Figure 12:
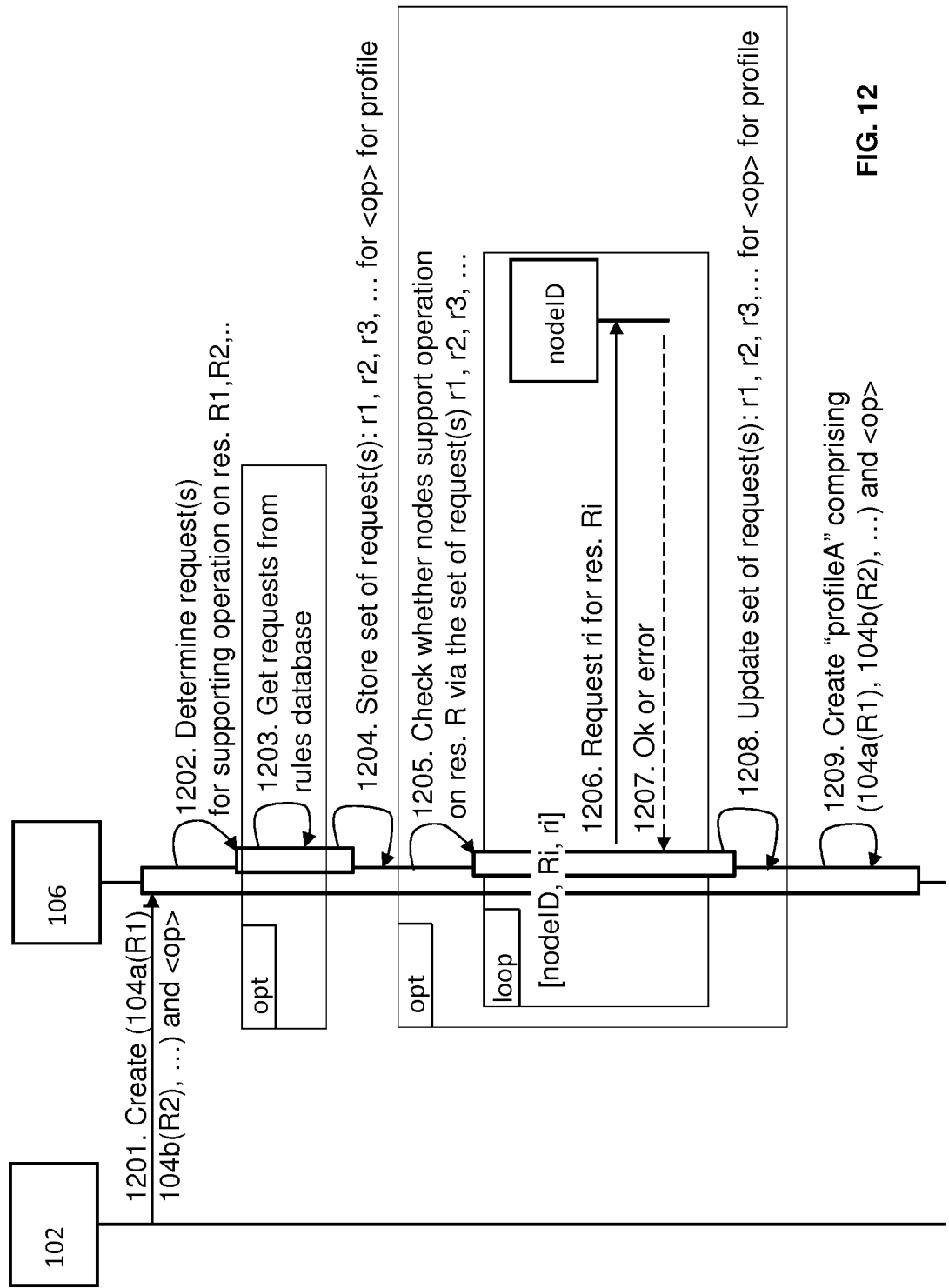
FIG. 12 shows an exemplary messaging diagram illustrating a request to create a profile with an operation, a validation of the profile, according to one embodiment of the disclosure.

FIG. 12 shows an exemplary messaging diagram illustrating a request to create a profile for an entity with an operation, a validation of the profile, according to one embodiment of the disclosure. While some operations have a direct correspondence with a request, others may have corresponding requests, which do not have a direct correspondence (referring to other types of operations described in relation to FIG. 9). In this example, a request to create a profile having an operation "op" is transmitted from the client 102 to the entity manager 106 (step 1201). The entity manager determines at least one corresponding request for performing at least a part of the operation (step 1202). In an exemplary situation, the entity manager may determine, based on a rules database, the corresponding request(s) (and if applicable, a function for processing the corresponding request(s) and/or responses thereto) for carrying out the operation (step 1203). The entity manager is configured to translate the operation into at least one corresponding request based on the rules database. The rules database may be stored in the storage of the entity manager. The rules database may associate operations with corresponding requests and/or function(s) for performing the associated operations. For instance, an operation may be associated with at least one corresponding request and optionally a function (e.g., compile into a list, average, max, min, etc.) for processing responses to the at least one corresponding request. The determined corresponding request(s) may be stored in the storage. The entity manager may store requests for the specified operation with the profile (step 1204) in the storage of the entity manager. The entity manager then verifies that the nodes support the operation (i.e., the corresponding request(s)) based on the supported resource(s) and/or capability(-ies) of the nodes (steps 1205). The entity manager may loop through the nodes to determine whether the corresponding request(s) is supported by the node (steps 1206 and 1207). Upon verification, the entity manager may update the requests for the specified operation stored with the profile (step 1208). The entity manager generates the profile (optionally attributing the profile identifier "/profileA" to the profile) and associates the resources as specified in the request and the operation to the profile (step 1209).

Figure 13:
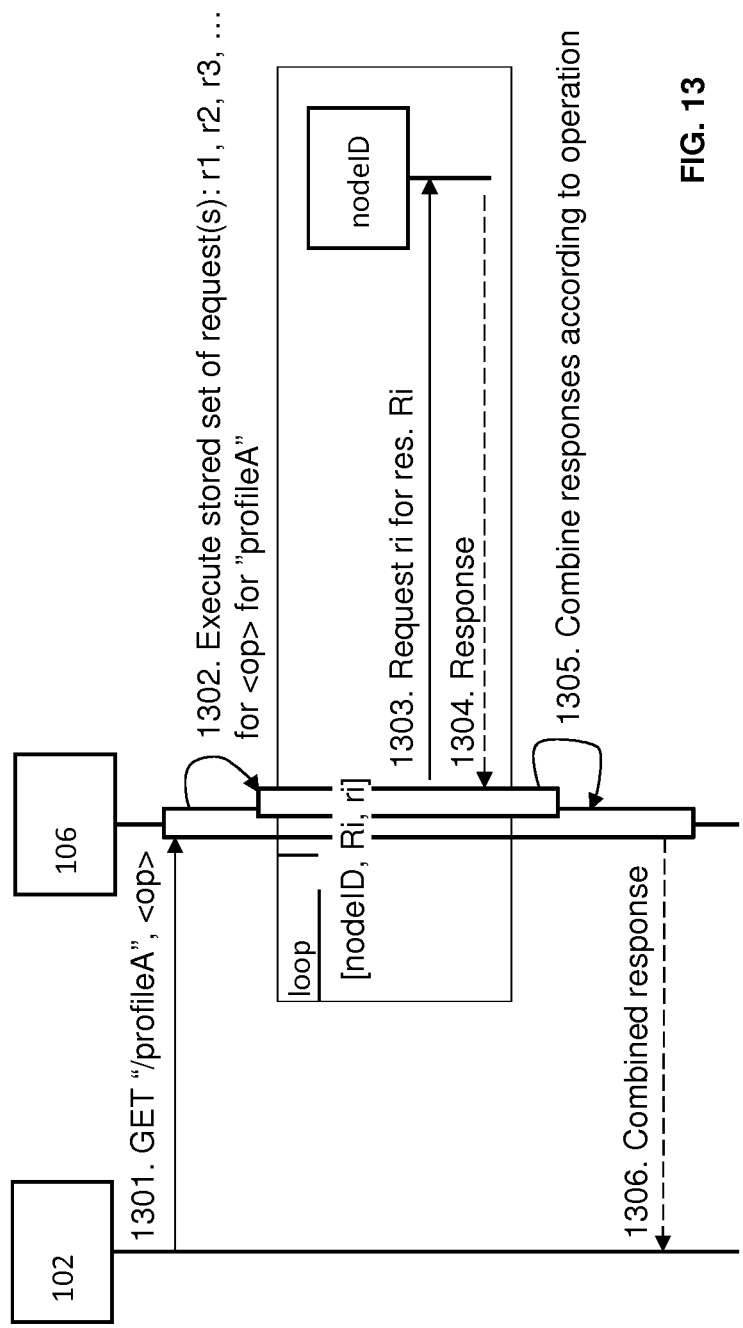
FIG. 13 shows an exemplary messaging diagram illustrating a request to interact with a plurality of nodes with an operation, according to one embodiment of the disclosure.

FIG. 13 shows an exemplary messaging diagram illustrating a request to interact with a plurality of nodes of an entity with an operation, according to one embodiment of the disclosure. To use the profile to perform the operation in interacting with the plurality of nodes of the entity, a request is transmitted from the client 102 to the entity manager 106 (step 1301). The request may include the profile identifier "profileA" and optionally include an instruction for the entity manager to perform the operation (e.g., by referencing the operation "op" in the request). If the operation is not specified, the entity manager may use a default operation for the profile. The entity manager may translate the operation to corresponding request(s) and execute the requests for operation "op" for the profile (step 1302). The entity manager may alternatively determine from the stored profile the corresponding request(s) for the operation (as previously determined, e.g., using the method described in FIG. 12). Iteratively, the corresponding request(s) are transmitted to (at least a subset) of the nodes of the profile and responses to the requests are received from the nodes (steps 1303 and 1304). A response is then derived (e.g., using a function associated with the operation) in accordance with the operation (e.g., by combining responses according to the operation according to a function) (step 1305). The response is provided to the client from the entity manager (step 1306).

The following includes examples of operations and the steps described above. In a first example, the operation comprises finding an average on resource values from nodes according to stored requests. The function for combining the responses includes summation and division. Accordingly, the entity manager sends the response with the average to the client. In a second example, the operation is not specified in the request in step 1301. The entity manager uses a default operation, e.g., to combine the responses by compiling the responses in a list. Accordingly, the response in step 1306 includes all the values received from the nodes. In a third example, the operation specified in the request in step 1301 requests the representation JSON to be used. The entity manager may request the nodes to provide resources in JSON representation or convert responses from the nodes to JSON if the node does not support JSON. The response 1306 provides a response in JSON. In a fourth example, the operation may specify any of the following and combinations thereof: to return a minimum of the values, to return a maximum of the values, to return a sum of the values, to request only a subset of the nodes and returning those values, and to return all of the values.

Figure 14:
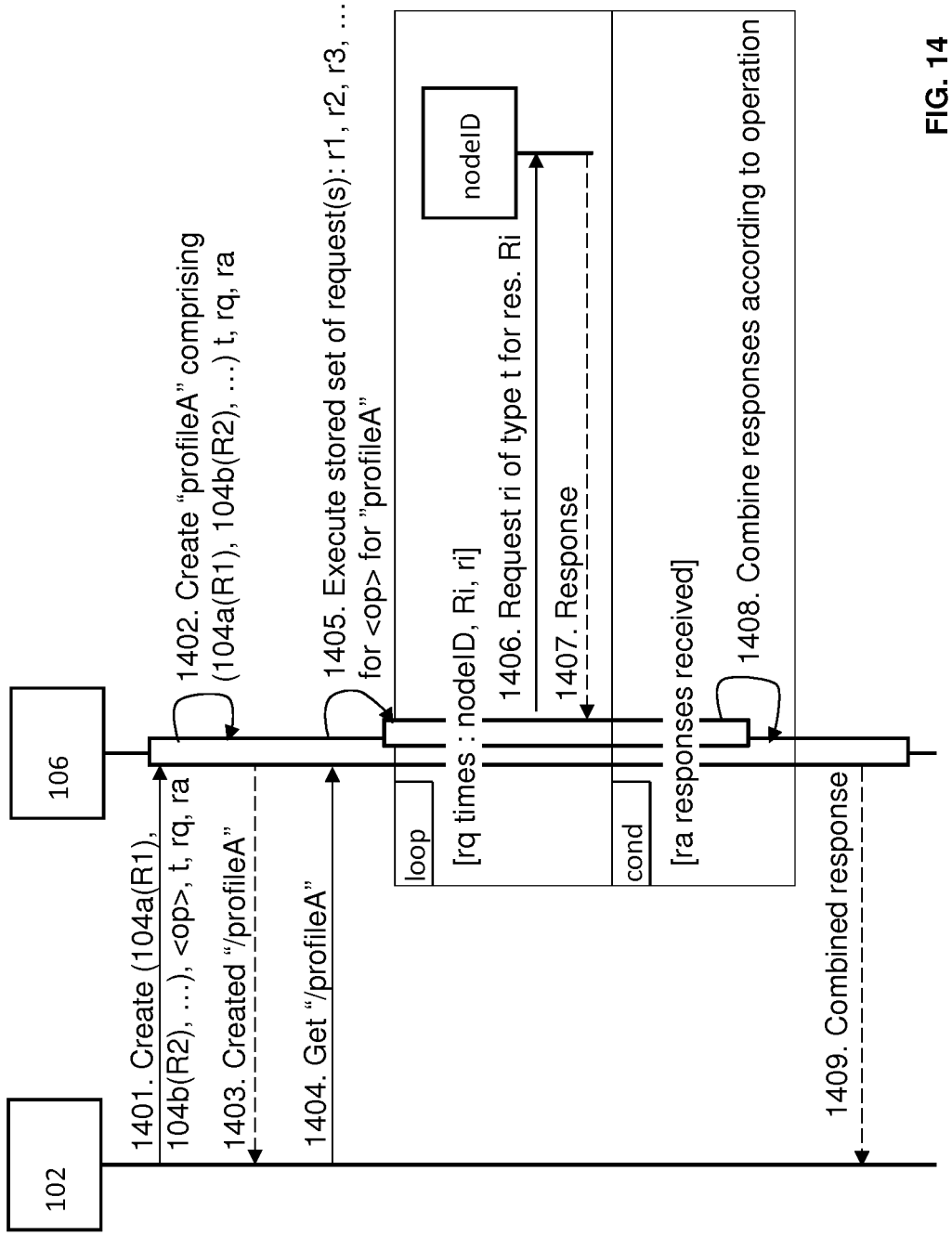
FIG. 14 shows an exemplary messaging diagram illustrating a request to create a profile having an operation and parameter(s) for the operation, according to one embodiment of the disclosure.

FIG. 14 shows an exemplary messaging diagram illustrating a request to create a profile for an entity having an operation and parameter(s) for the operation, according to one embodiment of the disclosure. In a more complex operation, the operation may be parameterized by at least one parameter. For instance, a request to create a profile to interact with resources across a plurality of nodes of the entity (e.g., 104*a*(R1), 104*b*(R2), . . . and R1=R2=R3=R4=/temp) is received at the entity manager and an operation may be specified (e.g., return a compiled list) (step 1401). According to the methods disclosed herein, the profile is created (step 1402) and optionally a response to indicate said profile is created is transmitted from the entity manager to the client (step 1403). The operation may be parameterized through at least one of the following parameters: a first parameter for indicating whether the at least one corresponding request is confirmable or non-confirmable, a second parameter for indicating a number or all of the nodes to which the at least one corresponding request is transmitted and a third parameter for indicating a minimum number or all of the nodes from which a response to the at least one corresponding request must be received before responding to a request to perform the operation. For example, the parameters for a combine operation may include "t=CON, rq=3, ra=2", which requests that the requests to the nodes to be confirmable, that three requests are sent to the nodes, and that the entity manager waits for at least two responses and combine the at least two responses. When a GET request referring to the profile is transmitted from the client to the entity manager (step 1404), the entity manager executes the corresponding requests for the operation according to the parameters to generate a response (steps 1405, 1406, 1407, and 1408). The response is provided from the entity manager to the client (step 1409).

Figure 15:
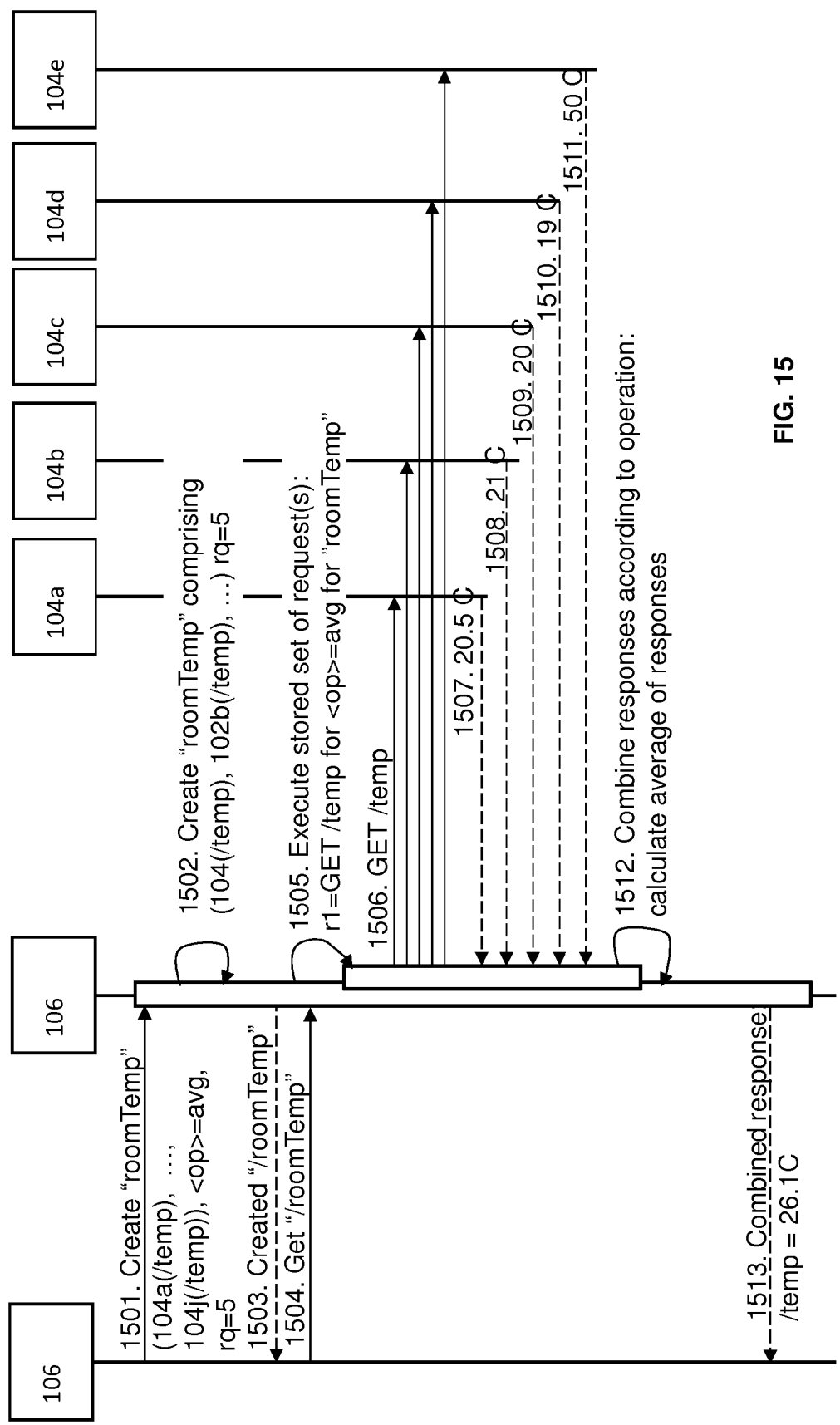
FIG. 15 shows an exemplary messaging diagram illustrating a request to create a profile having an operation "average", according to one embodiment of the disclosure.

FIG. 15 shows an exemplary messaging diagram illustrating a request to create a profile for an entity having an operation "average", according to one embodiment of the disclosure. In another example, a profile "/roomTemp" may be created for the temperature resources across 10 nodes (step 1501, 1502 and 1503). For illustrative purposes, only nodes 104*a*, 104*b*, 104*c*, 104*d* and 104*e* of the entity are shown, and nodes 104*f*, 104*g*, 104*h*, 104*i*, and 104*j* of the entity are omitted from the figure for simplicity. The operation associated with the profile is the average operation. Furthermore, the operation may be parameterized to specify that only 50% (5) of the nodes should be queried for the temperature resource. A request referring to the profile is received at the entity manager (step 1504), and the entity manager executes the operation (step 1505) by transmitting the GET request for the temperature resource to five of the nodes (e.g., nodes 104*a*, 104*b*, 104*c*, 104*d*, 104*e*) (step 1506). Five responses (e.g., "20.5 C", "21 C", "20 C", "19 C", "50 C") are returned from the nodes (steps 1507, 1508, 1509, 1510, 1511), and the entity manager combines the responses by computing a sum of the responses and divide the sum by 5 ("26.1 C") (step 1512). A response having the average temperature is generated and transmitted from the entity manager to the client (step 1513).

Figure 16:
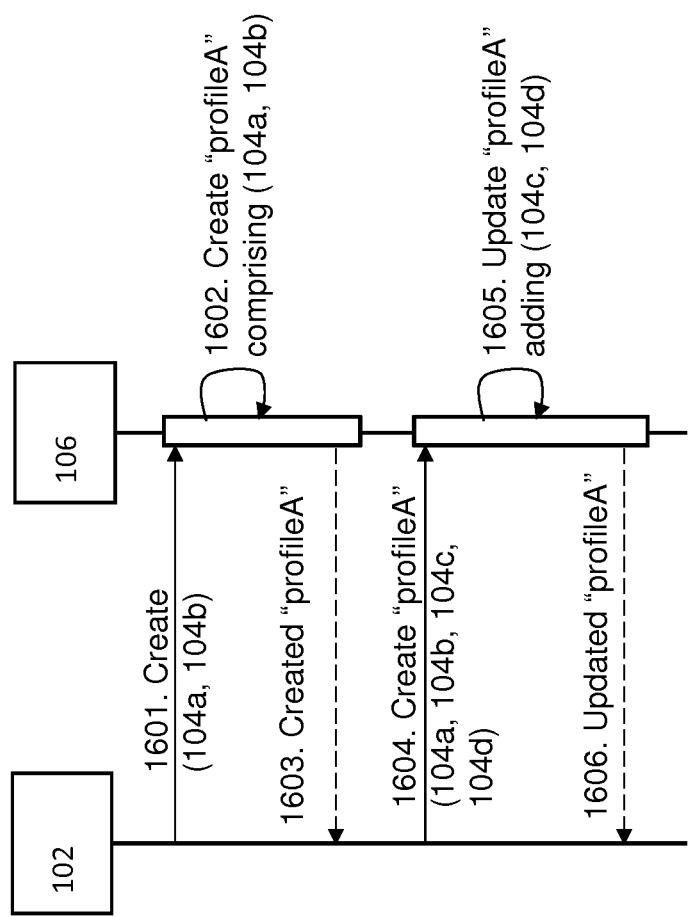
FIG. 16 shows an exemplary messaging diagram illustrating a request to create a profile and a request to update a profile, according to one embodiment of the disclosure.

FIG. 16 shows an exemplary messaging diagram illustrating a request to create a profile for an entity and a request to update a profile, according to one embodiment of the disclosure. A request to create a profile is transmitted from a client 102 to an entity manager 106 (step 1601). A profile having a profile identifier "/profileA" is created (step 1602). A response indicating that the profile is created with the profile identifier "/profileA" is transmitted (step 1603). The client may be configured to transmit another request referring to "/profileA" to the entity manager to add nodes (or any other updates or modifications to the profile, e.g., removing resources, changing operation, etc.) to the profile (step 1604). The request, e.g., may include the profile identifier and a list of nodes identifiers for the updated profile. Alternatively, the request may include the profile identifier and at least one change to the profile (i.e., indicating the difference, e.g., a list of node identifiers to add to the existing profile). The entity manager updates the profile, e.g., by validating the requested profile (e.g., validating the updated list of nodes specified in the request) (step 1605). Upon validation, the entity manager may transmit a response to the client indicating that the profile has been updated (step 1606).

FIGS. 3-16 are described in terms of steps to be performed, but it is not to be construed that the steps described must be performed in the exact order described and/or one after another. One skilled in the art may envision to change the order of the steps and/or to perform steps in parallel to achieve equivalent technical results.

Although in the figures, the entity manager is shown to determine the resource(s) and/or capability(-ies) supported by a node in a particular manner, the entity manager (e.g., the profile manager) may determine the resource(s) and/or capability(-ies) supported by a node in different manners. The entity manager may already maintain a storage of resource(s) and/or capability(-ies) supported by various nodes. The entity manager may query (e.g., in a resource discovery request) a node to determine the resource(s) and/or capability(-ies) supported by a node. The entity manager may query a resource directory to determine resource(s) and/or capability(-ies) supported by various nodes. Any combination of the above may be utilized by the entity manager.

With some modifications, one skilled in the art may extend the embodiments described herein to other architectures, networks, or technologies.

Various embodiments of the invention may be implemented as a program product for use with a computer system or a processor, where the program(s) of the program product define functions of the embodiments (including the methods described herein). In one embodiment, the program(s) can be contained on a variety of non-transitory computer-readable storage media (generally referred to as "storage"), where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored.

It is to be understood that any feature described in relation to any one embodiment may be used alone, or in combination with other features described, and may also be used in combination with one or more features of any other of the embodiments, or any combination of any other of the embodiments. Moreover, the invention is not limited to the embodiments described above, which may be varied within the scope of the accompanying claims.

The invention claimed is:

1. A method for creating a profile for accessing resources across a plurality of nodes in a network, each node associated with a node identifier, at least one resource, and/or at least one capability, the method comprising:
    receiving, from a client at an entity manager, at least one first request to create the profile, said at least one first request comprising the node identifiers;
    generating the profile, said profile comprising a list of node identifiers associated with the plurality of nodes, wherein the profile is addressable by a profile identifier;
wherein the at least one first request (1) further comprises an operation or (2) is associated with an operation by default at the entity manager, said method further comprising:
    verifying that the nodes are able to support the operation based on the at least one resource and/or the at least one capability associated with the plurality of nodes;
    if the nodes are able to support the operation, associating the profile with the operation.

2. The method according to claim 1, further comprising:
    verifying, by the entity manager, that the node identifiers in the at least one first request correspond to existing nodes in the network.

3. An entity manager for creating a profile for a group of nodes in a network, each node associated with a node identifier, at least one resource, and/or at least one capability, the entity manager comprising:
    a receiver for receiving, at the entity manager, at least one first request to create the profile from a client, said at least one first request comprising the node identifiers;
    a processor configured to generate the profile, said profile comprising the list of node identifiers, wherein the profile is addressable by a profile identifier;
    a transmitter for optionally transmitting a first response from the entity manager to the client, said response indicating that the profile has been created at the entity manager;
    wherein the entity manager is configured to implement the method of claim 2.

4. A system comprising a plurality of nodes in a network and the entity manager of claim 3 for creating a profile for accessing resources across the plurality of nodes, said entity manager communicably connected to the plurality of nodes.

5. The method according to claim 1, further comprising:
    determining a first set of at least one resource associated with a first one of the plurality of nodes;
    determining a second set of at least one resource associated with a second one of the plurality of nodes;
    determining at least one common resource present in the first set and the second set;
    associating the profile with the at least one common resource.

6. The method according to claim 1, further comprising:
determining a first set of at least one capability associated with a first one of the plurality of nodes;
determining a second set of at least one capability associated with the second one of the plurality of nodes;
determining at least one common capability present in and/or at least partly supported by both the first set and the second set;
associating the profile with the at least one common capability.

7. The method according to claim 1, wherein:
the at least one first request further comprises at least one resource associated with each of the node identifiers in the at least one first request;
the at least one resource associated with each of the node identifiers is the same, or alternatively, different for each of the node identifiers;
optionally, the method further comprising verifying that the at least one resource associated with each of the node identifiers exist on the nodes identified by the node identifiers.

8. The method according to claim 1, further comprising:
determining at least one corresponding request for performing at least a part of the operation;
optionally, translating the operation into the at least one corresponding request based on a rules database associating operations with corresponding requests for performing the associated operations;
optionally, verifying that the plurality of nodes support the at least one corresponding request based on the at least one resource and/or the at least one capability associated with the plurality of nodes.

9. The method according to claim 8, further comprising:
receiving, at the entity manager, a second request comprising the profile identifier from the client and optionally an instruction for the entity to perform the operation;
transmitting the at least one of the corresponding request associated with the operation to at least some of the nodes;
receiving at least one response to the at least one corresponding request from the at least some of the nodes;
deriving a second response in accordance with the operation by processing the at least one response from the at least some of the nodes;
transmitting the second response to the client.

10. The method according to claim 9, wherein transmitting at least one corresponding request comprises transmitting at least one corresponding request to only a subset of the nodes to perform at least part of the requested operation.

11. The method according to claim 9, wherein deriving the second response comprises at least one of:
compiling all of the at least one response to a list and the second response comprises said list;
determining a minimum value from the at least one response and the second response comprises said minimum value;
determining a maximum value from the at least one response and the second response comprises said maximum value;
determining an average value from the at least one response and the second response comprises said average value; and
determining a sum of values from the at least one response and the second response comprises said sum of values.

12. The method according to claim 1, further comprising:
receiving a second request at the entity manager, said second request comprising the profile identifier and a change to the profile;
updating the profile at the entity manager based on the change to the profile.

13. The method according to claim 1,
(1) wherein the at least one first request further comprises the profile identifier to be attributed to the profile and the method further comprises associating the profile identifier with the profile; or
(2) the method further comprises generating the profile identifier, associating the profile identifier with the profile, and transmitting the profile identifier to the client.

14. The method according to claim 1, wherein at least one of the plurality of nodes comprises a constrained device, and optionally, at least one of the plurality of nodes is communicably connected to the entity manager over a low power and lossy network.

15. The method according to claim 1, further comprising transmitting a first response from the entity manager to the client, said response indicating that the profile has been created at the entity manager.

16. A computer program product, implemented on computer-readable non-transitory storage medium, the computer program product configured for, when run on a computer, executing the method steps according to claim 1.

17. A method for creating a profile for accessing resources across a plurality of nodes in a network, each node associated with a node identifier, at least one resource, and/or at least one capability, the method comprising:
receiving, from a client at an entity manager, at least one first request to create the profile, said at least one first request comprising the node identifiers;
generating the profile, said profile comprising a list of node identifiers associated with the plurality of nodes, wherein the profile is addressable by a profile identifier, wherein the at least one first request to create the profile (1) comprises an operation or (2) is associated with an operation by default, and said operation associated with at least one corresponding request, and said at least one first request further comprises at least one of the following parameters for parameterizing the operation:
a first parameter for indicating whether the at least one corresponding request is confirmable or non-confirmable;
a second parameter for indicating a number or all of the nodes to which the at least one corresponding request is transmitted;
a third parameter for indicating a minimum number or all of the nodes from which a response to the at least one corresponding request must be received before responding to a request to perform the operation.

* * * * *